United States Patent
Egozy et al.

(10) Patent No.: US 8,663,013 B2
(45) Date of Patent: Mar. 4, 2014

(54) SYSTEMS AND METHODS FOR SIMULATING A ROCK BAND EXPERIENCE

(75) Inventors: Eran B. Egozy, Brookline, MA (US); Daniel Teasdale, Cambridge, MA (US); Brian Thomas Stephens, Marblehead, MA (US); Daniel Schmidt, Somerville, MA (US); John R. Eskew, Allston, MA (US); Rafael Baptista, Arlington, MA (US); Kasson Crooker, Arlington, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 771 days.

(21) Appl. No.: 12/499,620

(22) Filed: Jul. 8, 2009

(65) Prior Publication Data
US 2010/0009750 A1  Jan. 14, 2010

Related U.S. Application Data

(60) Provisional application No. 61/079,094, filed on Jul. 8, 2008.

(51) Int. Cl.
 *A63F 9/24* (2006.01)
 *A63F 13/00* (2006.01)
(52) U.S. Cl.
 USPC ............ 463/42; 463/7; 463/35; 463/43
(58) Field of Classification Search
 USPC .............. 463/7, 31, 35, 42, 43; 434/307 A; 84/477 R, 609
 See application file for complete search history.

(56) References Cited

U.S. PATENT DOCUMENTS

| | | |
|---|---|---|
| D211,666 S | 7/1968 | MacGillavry |
| 3,430,530 A | 3/1969 | Grind et al. |
| D245,038 S | 7/1977 | Ebata et al. |

(Continued)

FOREIGN PATENT DOCUMENTS

| | | |
|---|---|---|
| AU | 741239 B2 | 11/2001 |
| DE | 69726507 T2 | 11/2004 |

(Continued)

OTHER PUBLICATIONS

The International Search Report for International Application No. PCT/US2009/049943, Date of Mailing Nov. 17, 2009 (5 pages).

(Continued)

*Primary Examiner* — David L Lewis
*Assistant Examiner* — Robert Mosser
(74) *Attorney, Agent, or Firm* — Wilmer Cutler Pickering Hale and Dorr LLP

(57) ABSTRACT

Described are methods, systems, apparatuses, computer program products embodied in a computer-readable storage medium and means for providing online challenges between bands in a musical video game. Typically the invention is executed on a game server in signal communication with a game platform and involves receiving, by the game server, musical game input data representing a musical performance of a band. Then, the game server calculates a composite score from the input data based on a gameplay challenge. Then the composite score is compared to a composite score of a second band's performance for the same gameplay challenge. In some embodiments, the comparison is displayed as a real-time representation of the two bands, even though score of the second band is based on a stored performance of the second band.

48 Claims, 9 Drawing Sheets

(56) References Cited

U.S. PATENT DOCUMENTS

| | | |
|---|---|---|
| D247,795 S | 4/1978 | Darrell |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| D310,668 S | 9/1990 | Takada |
| 5,074,182 A | 12/1991 | Capps et al. |
| 5,107,743 A | 4/1992 | Decker |
| D345,554 S | 3/1994 | Dones |
| 5,393,926 A | 2/1995 | Johnson |
| 5,398,585 A | 3/1995 | Starr |
| 5,399,799 A | 3/1995 | Gabriel |
| 5,464,946 A | 11/1995 | Lewis |
| 5,482,087 A | 1/1996 | Overbergh et al. |
| 5,491,297 A | 2/1996 | Johnson et al. |
| 5,513,129 A | 4/1996 | Bolas et al. |
| 5,524,637 A | 6/1996 | Erickson |
| 5,537,528 A | 7/1996 | Takahashi et al. |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,670,729 A | 9/1997 | Miller et al. |
| D389,216 S | 1/1998 | Isetani et al. |
| 5,704,836 A | 1/1998 | Norton et al. |
| 5,723,802 A | 3/1998 | Johnson et al. |
| 5,734,961 A | 3/1998 | Castille |
| 5,763,804 A | 6/1998 | Rigopulos et al. |
| D398,916 S | 9/1998 | Bernardi |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,833,469 A | 11/1998 | Ito et al. |
| D403,024 S | 12/1998 | Muraki et al. |
| 5,861,881 A | 1/1999 | Freeman et al. |
| 5,880,788 A | 3/1999 | Bregler |
| 5,886,275 A | 3/1999 | Kato et al. |
| D411,258 S | 6/1999 | Isetani et al. |
| 5,915,288 A | 6/1999 | Gabriel |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,990,405 A | 11/1999 | Auten et al. |
| 5,999,173 A | 12/1999 | Ubillos |
| 6,011,212 A | 1/2000 | Rigopulos et al. |
| 6,016,380 A | 1/2000 | Norton |
| 6,032,156 A | 2/2000 | Marcus |
| 6,065,042 A | 5/2000 | Reimer et al. |
| 6,067,126 A | 5/2000 | Alexander |
| 6,072,480 A | 6/2000 | Gorbet et al. |
| 6,073,489 A | 6/2000 | French et al. |
| 6,074,215 A | 6/2000 | Tsurumi |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,142,870 A | 11/2000 | Wada et al. |
| 6,150,947 A | 11/2000 | Shima |
| 6,177,623 B1 | 1/2001 | Ooseki |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 | 2/2002 | Yoshitomi et al. |
| 6,350,942 B1 | 2/2002 | Thomson |
| 6,353,174 B1 | 3/2002 | Schmidt et al. |
| D455,792 S | 4/2002 | Isetani et al. |
| 6,379,244 B1 | 4/2002 | Sagawa et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,425,822 B1 | 7/2002 | Hayashida et al. |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,504,990 B1 | 1/2003 | Abecassis |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,570,078 B2 | 5/2003 | Ludwig |
| 6,577,330 B1 | 6/2003 | Tsuda et al. |
| 6,582,309 B2 | 6/2003 | Higurashi et al. |
| 6,589,120 B1 | 7/2003 | Takahashi |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,659,873 B1 | 12/2003 | Kitano et al. |
| 6,661,496 B2 | 12/2003 | Sherman et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |

(56) References Cited

U.S. PATENT DOCUMENTS

| | | |
|---|---|---|
| 6,684,480 B2 | 2/2004 | Conrad |
| 6,695,694 B2 | 2/2004 | Ishikawa et al. |
| 6,712,692 B2 | 3/2004 | Basson et al. |
| 6,733,382 B2 | 5/2004 | Oe et al. |
| 6,738,052 B1 | 5/2004 | Manke et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,843,726 B1 | 1/2005 | Nomi et al. |
| 6,852,034 B2 | 2/2005 | Nagata et al. |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,905,413 B1 | 6/2005 | Terao et al. |
| 6,915,488 B2 | 7/2005 | Omori et al. |
| 6,921,332 B2 | 7/2005 | Fukunaga et al. |
| 6,936,758 B2 * | 8/2005 | Itoh ................ 84/470 R |
| 6,949,023 B1 | 9/2005 | Okubo et al. |
| 6,964,610 B2 | 11/2005 | Yamauchi et al. |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,027,046 B2 | 4/2006 | Zhang |
| 7,027,124 B2 | 4/2006 | Foote et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,076 B2 * | 1/2007 | McHale et al. ................ 84/616 |
| 7,170,510 B2 | 1/2007 | Kawahara et al. |
| 7,192,353 B2 | 3/2007 | Okubo |
| 7,194,676 B2 | 3/2007 | Fayan et al. |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,227,526 B2 | 6/2007 | Hildreth et al. |
| 7,259,971 B1 | 8/2007 | Allen et al. |
| 7,263,668 B1 | 8/2007 | Lentz |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| 7,367,887 B2 | 5/2008 | Watabe et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,430,360 B2 | 9/2008 | Abecassis |
| 7,432,810 B2 | 10/2008 | Menache et al. |
| 7,435,178 B1 | 10/2008 | Tam et al. |
| 7,458,025 B2 | 11/2008 | Crow et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| D590,407 S | 4/2009 | Watanabe et al. |
| 7,536,654 B2 | 5/2009 | Anthony et al. |
| 7,546,130 B2 | 6/2009 | Vance |
| 7,559,841 B2 | 7/2009 | Hashimoto |
| D599,812 S | 9/2009 | Hirsch |
| D599,819 S | 9/2009 | Lew |
| 7,582,015 B2 | 9/2009 | Onoda et al. |
| 7,593,618 B2 | 9/2009 | Xu et al. |
| 7,599,554 B2 | 10/2009 | Agnihotri et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,774,706 B2 | 8/2010 | Sakai |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,814,436 B2 | 10/2010 | Schrag et al. |
| 7,823,070 B2 | 10/2010 | Nelson et al. |
| 7,840,288 B2 * | 11/2010 | Graepel et al. ................ 700/93 |
| 7,840,907 B2 | 11/2010 | Kikuchi et al. |
| D628,582 S | 12/2010 | Kurozumi et al. |

(56) References Cited

U.S. PATENT DOCUMENTS

| | | |
|---|---|---|
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| 8,057,290 B2 | 11/2011 | Vance et al. |
| D650,802 S | 12/2011 | Jang et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0035868 A1 | 11/2001 | Uehara et al. |
| 2001/0036861 A1 | 11/2001 | Uehara et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0094865 A1 | 7/2002 | Araki et al. |
| 2002/0105229 A1 | 8/2002 | Makoto |
| 2002/0119811 A1 | 8/2002 | Yabe et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1* | 11/2002 | Egozy et al. ............ 463/7 |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0017872 A1 | 1/2003 | Oishi et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0012540 A1 | 1/2004 | Treibitz et al. |
| 2004/0021684 A1 | 2/2004 | Millner |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0127282 A1 | 7/2004 | Naobayashi |
| 2004/0127291 A1 | 7/2004 | George et al. |
| 2004/0132531 A1 | 7/2004 | George et al. |
| 2004/0137984 A1 | 7/2004 | Salter |
| 2004/0152514 A1 | 8/2004 | Kasai et al. |
| 2004/0204211 A1 | 10/2004 | Suzuki |
| 2004/0204238 A1 | 10/2004 | Aoki |
| 2004/0207774 A1 | 10/2004 | Gothard |
| 2004/0209673 A1 | 10/2004 | Shiraishi |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0049047 A1 | 3/2005 | Kitao |
| 2005/0059480 A1 | 3/2005 | Soukup et al. |
| 2005/0060231 A1 | 3/2005 | Soukup et al. |
| 2005/0070349 A1 | 3/2005 | Kimura |

(56) References Cited

U.S. PATENT DOCUMENTS

| | | |
|---|---|---|
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0106546 A1 | 5/2005 | Strom |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0235809 A1* | 10/2005 | Kageyama ............... 84/601 |
| 2005/0250565 A1 | 11/2005 | Nojiri et al. |
| 2005/0252362 A1 | 11/2005 | McHale et al. |
| 2005/0255923 A1 | 11/2005 | Aoki |
| 2006/0009282 A1 | 1/2006 | George et al. |
| 2006/0009979 A1 | 1/2006 | McHale et al. |
| 2006/0030382 A1 | 2/2006 | Okamura et al. |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0063573 A1 | 3/2006 | Ishikawa et al. |
| 2006/0107819 A1 | 5/2006 | Salter |
| 2006/0135253 A1 | 6/2006 | George et al. |
| 2006/0152622 A1 | 7/2006 | Tan et al. |
| 2006/0166744 A1 | 7/2006 | Igarashi et al. |
| 2006/0180008 A1 | 8/2006 | Negoescu et al. |
| 2006/0189879 A1 | 8/2006 | Miyajima et al. |
| 2006/0204214 A1 | 9/2006 | Shah et al. |
| 2006/0247046 A1 | 11/2006 | Choi et al. |
| 2006/0252503 A1 | 11/2006 | Salter |
| 2006/0288842 A1 | 12/2006 | Sitrick et al. |
| 2007/0026943 A1 | 2/2007 | Yoshimura |
| 2007/0060312 A1 | 3/2007 | Dempsey et al. |
| 2007/0088812 A1 | 4/2007 | Clark |
| 2007/0155494 A1 | 7/2007 | Wells et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0234284 A1 | 10/2007 | Tanner et al. |
| 2007/0234881 A1 | 10/2007 | Takehisa |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0026355 A1 | 1/2008 | Petef |
| 2008/0096654 A1 | 4/2008 | Mondesir et al. |
| 2008/0101762 A1 | 5/2008 | Kellock et al. |
| 2008/0102958 A1 | 5/2008 | Kitamura et al. |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0222685 A1 | 9/2008 | McCarthy et al. |
| 2008/0273755 A1 | 11/2008 | Hildreth |
| 2008/0276175 A1 | 11/2008 | Kim et al. |
| 2008/0288866 A1 | 11/2008 | Spencer et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0069096 A1 | 3/2009 | Nishimoto |
| 2009/0073117 A1 | 3/2009 | Tsurumi et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0245241 A1 | 9/2010 | Kim et al. |
| 2010/0247081 A1 | 9/2010 | Victoria Pons |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0299405 A1 | 11/2010 | Socher et al. |
| 2010/0300265 A1 | 12/2010 | Foster et al. |
| 2010/0300272 A1 | 12/2010 | Scherf |
| 2010/0304812 A1 | 12/2010 | Stoddard et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0021273 A1 | 1/2011 | Buckley et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0021833 A1 | 1/2012 | Boch et al. |
| 2012/0052947 A1 | 3/2012 | Yun |
| 2012/0063617 A1 | 3/2012 | Ramos |
| 2012/0069131 A1 | 3/2012 | Abelow |

(56) References Cited

U.S. PATENT DOCUMENTS

| | | |
|---|---|---|
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |

FOREIGN PATENT DOCUMENTS

| | | | |
|---|---|---|---|
| DE | 69832379 T2 | 8/2006 | |
| EP | 919267 A2 | 6/1999 | |
| EP | 972550 A2 | 1/2000 | |
| EP | 974382 A1 | 1/2000 | |
| EP | 974954 A1 | 1/2000 | |
| EP | 978301 A1 | 2/2000 | |
| EP | 982055 A1 | 3/2000 | |
| EP | 992928 A2 | 4/2000 | |
| EP | 992929 A2 | 4/2000 | |
| EP | 993847 A1 | 4/2000 | |
| EP | 0997870 A1 | 5/2000 | |
| EP | 1003130 A2 | 5/2000 | |
| EP | 1022672 A1 | 7/2000 | |
| EP | 1029565 A2 | 8/2000 | |
| EP | 1029571 A2 | 8/2000 | |
| EP | 1031363 A2 | 8/2000 | |
| EP | 1031904 A2 | 8/2000 | |
| EP | 1033157 A2 | 9/2000 | |
| EP | 1033158 A2 | 9/2000 | |
| EP | 1043745 A1 | 10/2000 | |
| EP | 1043746 A1 | 10/2000 | |
| EP | 1048330 A2 | 11/2000 | |
| EP | 1061501 A1 | 12/2000 | |
| EP | 1064974 A2 | 1/2001 | |
| EP | 1064975 A2 | 1/2001 | |
| EP | 1066866 A2 | 1/2001 | |
| EP | 1079368 A1 | 2/2001 | |
| EP | 1 081 680 A1 | 3/2001 | |
| EP | 1081679 A1 | 3/2001 | |
| EP | 1082981 A2 | 3/2001 | |
| EP | 1082982 A2 | 3/2001 | |
| EP | 1082983 A2 | 3/2001 | |
| EP | 1088573 A2 | 4/2001 | |
| EP | 1114659 A2 | 7/2001 | |
| EP | 1122703 A2 | 8/2001 | |
| EP | 1125607 A2 | 8/2001 | |
| EP | 1125613 A2 | 8/2001 | |
| EP | 1127599 A2 | 8/2001 | |
| EP | 1130569 A2 | 9/2001 | |
| EP | 1132889 A2 | 9/2001 | |
| EP | 1134723 A2 | 9/2001 | |
| EP | 1136107 A2 | 9/2001 | |
| EP | 1138357 A1 | 10/2001 | |
| EP | 1139293 A2 | 10/2001 | |
| EP | 1145744 A2 | 10/2001 | |
| EP | 1145745 A2 | 10/2001 | |
| EP | 1145748 A2 | 10/2001 | |
| EP | 1145749 A2 | 10/2001 | |
| EP | 1150276 A2 | 10/2001 | |
| EP | 1151770 A2 | 11/2001 | |
| EP | 1151773 A2 | 11/2001 | |
| EP | 1157723 A2 | 11/2001 | |
| EP | 1159992 A2 | 12/2001 | |
| EP | 1160762 A2 | 12/2001 | |
| EP | 1161974 A2 | 12/2001 | |
| EP | 1170041 A2 | 1/2002 | |
| EP | 1178427 A1 | 2/2002 | |
| EP | 1184061 A1 | 3/2002 | |
| EP | 1187427 A2 | 3/2002 | |
| EP | 1192976 A2 | 4/2002 | |
| EP | 1195721 A2 | 4/2002 | |
| EP | 1197947 A2 | 4/2002 | |
| EP | 1199702 A2 | 4/2002 | |
| EP | 1199703 A2 | 4/2002 | |
| EP | 1206950 A2 | 5/2002 | |
| EP | 1208885 A1 | 5/2002 | |
| EP | 1214959 A2 | 6/2002 | |
| EP | 1220539 A2 | 7/2002 | |
| EP | 1228794 A2 | 8/2002 | |
| EP | 1245255 A2 | 10/2002 | |
| EP | 1249260 A2 | 10/2002 | |
| EP | 1258274 A2 | 11/2002 | |
| EP | 1264622 A2 | 12/2002 | |
| EP | 1270049 A2 | 1/2003 | |
| EP | 1270050 A2 | 1/2003 | |
| EP | 1271294 A2 | 1/2003 | |
| EP | 1279425 A2 | 1/2003 | |
| EP | 1287864 A2 | 3/2003 | |
| EP | 1306112 A1 | 5/2003 | |
| EP | 1413340 A1 | 4/2004 | |
| EP | 1503365 A1 | 2/2005 | |
| EP | 1533010 A1 | 5/2005 | |
| EP | 1542132 A1 | 6/2005 | |
| EP | 1552864 A1 | 7/2005 | |
| EP | 1552865 A1 | 7/2005 | |
| EP | 1569171 A1 | 8/2005 | |
| EP | 1604711 A1 | 12/2005 | |
| EP | 1609513 A1 | 12/2005 | |
| EP | 1630746 A1 | 3/2006 | |
| EP | 1666109 A1 | 6/2006 | |
| EP | 1696385 A2 | 8/2006 | |
| EP | 1699017 A2 | 9/2006 | |
| EP | 1731204 A1 | 12/2006 | |
| EP | 1743680 A1 | 1/2007 | |
| EP | 1 825 896 | 8/2007 | |
| EP | 2000190 A2 | 12/2008 | |
| EP | 2206539 A1 | 7/2010 | |
| EP | 2206540 A1 | 7/2010 | |
| GB | 2118809 A | 11/1983 | |
| GB | 2425730 A | 11/2006 | |
| GB | 2465918 A | 6/2010 | |
| GB | 2471871 A | 1/2011 | |
| JP | 7185131 | 7/1995 | |
| JP | 11151380 A | 6/1999 | |
| JP | 11156054 A | 6/1999 | |
| JP | 11219443 A | 8/1999 | |
| JP | 11313979 A | 11/1999 | |
| JP | 2000014931 | 1/2000 | |
| JP | 2000037490 | 2/2000 | |
| JP | 2000107447 A | 4/2000 | |
| JP | 2000107458 | 4/2000 | |
| JP | 2000112485 A | 4/2000 | |
| JP | 2000116938 A | 4/2000 | |
| JP | 2000157723 | 6/2000 | |
| JP | 2000218046 | 8/2000 | |
| JP | 2000237454 A | 9/2000 | |
| JP | 2000237455 A | 9/2000 | |
| JP | 2000245957 | 9/2000 | |
| JP | 2000245964 A | 9/2000 | |
| JP | 2000250534 | 9/2000 | |
| JP | 2000293292 A | 10/2000 | |
| JP | 2000293294 A | 10/2000 | |
| JP | 2000300838 A | 10/2000 | |
| JP | 2000308759 A | 11/2000 | |
| JP | 2000325665 A | 11/2000 | |
| JP | 2000350861 A | 12/2000 | |
| JP | 2001000610 A | 1/2001 | |
| JP | 2001009149 A | 1/2001 | |
| JP | 2001009152 A | 1/2001 | |
| JP | 2001009157 A | 1/2001 | |
| JP | 2001062144 A | 3/2001 | |
| JP | 2001070637 A | 3/2001 | |
| JP | 2001070640 A | 3/2001 | |
| JP | 2001070652 A | 3/2001 | |
| JP | 2001075579 A | 3/2001 | |
| JP | 2001096059 A | 4/2001 | |
| JP | 2001096061 A | 4/2001 | |
| JP | 2001129244 A | 5/2001 | |
| JP | 2001145777 A | 5/2001 | |
| JP | 2001145778 A | 5/2001 | |
| JP | 2001190834 A | 7/2001 | |
| JP | 2001190835 A | 7/2001 | |
| JP | 2001190844 A | 7/2001 | |
| JP | 2001198351 A | 7/2001 | |
| JP | 2001198354 A | 7/2001 | |
| JP | 2001212369 A | 8/2001 | |

(56) References Cited

FOREIGN PATENT DOCUMENTS

| | | |
|---|---|---|
| JP | 2001218980 A | 8/2001 |
| JP | 2001222280 A | 8/2001 |
| JP | 2001224850 A | 8/2001 |
| JP | 2001231904 A | 8/2001 |
| JP | 2001252467 A | 9/2001 |
| JP | 2001252470 | 9/2001 |
| JP | 2001259224 A | 9/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 | 12/2001 |
| JP | 2002000936 | 1/2002 |
| JP | 2002018123 | 1/2002 |
| JP | 2002018134 | 1/2002 |
| JP | 2002028368 | 1/2002 |
| JP | 2002045567 | 2/2002 |
| JP | 2002056340 | 2/2002 |
| JP | 2002066127 | 3/2002 |
| JP | 2002066128 | 3/2002 |
| JP | 2002084292 | 3/2002 |
| JP | 2002116752 | 4/2002 |
| JP | 2002140727 | 5/2002 |
| JP | 2002143567 | 5/2002 |
| JP | 2002153673 | 5/2002 |
| JP | 2002204426 | 7/2002 |
| JP | 2002204426 A | 7/2002 |
| JP | 2002224435 | 8/2002 |
| JP | 2002239223 | 8/2002 |
| JP | 2002239233 | 8/2002 |
| JP | 2002282417 | 10/2002 |
| JP | 2002282418 | 10/2002 |
| JP | 2002292123 | 10/2002 |
| JP | 2002292139 | 10/2002 |
| JP | 2002301263 A | 10/2002 |
| JP | 2002325975 | 11/2002 |
| JP | 2002360937 | 12/2002 |
| JP | 2003000951 | 1/2003 |
| JP | 2003010541 | 1/2003 |
| JP | 2003010542 | 1/2003 |
| JP | 2003019346 | 1/2003 |
| JP | 2003030686 | 1/2003 |
| JP | 2003058317 | 2/2003 |
| JP | 2003126548 | 5/2003 |
| JP | 2003175279 | 6/2003 |
| JP | 2003236244 | 8/2003 |
| JP | 2003334387 A | 11/2003 |
| JP | 2004016315 | 1/2004 |
| JP | 2004016388 | 1/2004 |
| JP | 2004033266 | 2/2004 |
| JP | 2004097610 | 4/2004 |
| JP | 2004105309 | 4/2004 |
| JP | 2004121397 | 4/2004 |
| JP | 2004141261 | 5/2004 |
| JP | 2004164519 | 6/2004 |
| JP | 3545983 | 7/2004 |
| JP | 3546206 | 7/2004 |
| JP | 3547374 | 7/2004 |
| JP | 2004192069 | 7/2004 |
| JP | 2004201937 | 7/2004 |
| JP | 3561456 | 9/2004 |
| JP | 3566195 | 9/2004 |
| JP | 3573288 | 10/2004 |
| JP | 3576994 | 10/2004 |
| JP | 3582716 | 10/2004 |
| JP | 2004283249 | 10/2004 |
| JP | 2004321245 | 11/2004 |
| JP | 3597465 | 12/2004 |
| JP | 2004337256 | 12/2004 |
| JP | 3611807 | 1/2005 |
| JP | 2005046445 A | 2/2005 |
| JP | 2005049913 | 2/2005 |
| JP | 3626711 | 3/2005 |
| JP | 3634273 | 3/2005 |
| JP | 2005095440 | 4/2005 |
| JP | 3656118 | 6/2005 |
| JP | 3686906 | 8/2005 |
| JP | 3699660 | 9/2005 |
| JP | 3702269 | 10/2005 |
| JP | 2005287830 | 10/2005 |
| JP | 2005301578 | 10/2005 |
| JP | 3715513 | 11/2005 |
| JP | 2005319025 | 11/2005 |
| JP | 3727275 | 12/2005 |
| JP | 2006020758 | 1/2006 |
| JP | 3751968 | 3/2006 |
| JP | 3751969 | 3/2006 |
| JP | 3753425 | 3/2006 |
| JP | 3804939 | 8/2006 |
| JP | 3816931 | 8/2006 |
| JP | 3822887 | 9/2006 |
| JP | 3831695 | 10/2006 |
| JP | 3869175 | 1/2007 |
| JP | 3890445 | 3/2007 |
| TW | 340049 | 3/2009 |
| TW | 201006526 A | 2/2010 |
| TW | 322023 | 3/2010 |
| TW | 201116318 A | 5/2011 |
| WO | WO-9717598 A1 | 5/1997 |
| WO | WO-9938588 | 8/1999 |
| WO | WO-01/63592 A2 | 8/2001 |
| WO | WO-0230535 A1 | 4/2002 |
| WO | WO-2004002590 | 1/2004 |
| WO | WO-2004002594 | 1/2004 |
| WO | WO-2004024256 | 3/2004 |
| WO | WO-2004024263 | 3/2004 |
| WO | WO-2004027631 | 4/2004 |
| WO | WO-2004030779 | 4/2004 |
| WO | WO-2004039055 A2 | 5/2004 |
| WO | WO-2004053800 | 6/2004 |
| WO | WO-2004082786 | 9/2004 |
| WO | WO-2004087272 | 10/2004 |
| WO | WO-2004101093 | 11/2004 |
| WO | WO-2004107270 | 12/2004 |
| WO | WO-2005027062 | 3/2005 |
| WO | WO-2005027063 | 3/2005 |
| WO | WO-2005030354 | 4/2005 |
| WO | WO-2005099842 | 10/2005 |
| WO | WO-2005107902 | 11/2005 |
| WO | WO-2005114648 | 12/2005 |
| WO | WO-2006006274 | 1/2006 |
| WO | WO-2006075494 | 7/2006 |
| WO | WO-2007070738 A2 | 6/2007 |
| WO | WO-2007078639 | 7/2007 |
| WO | WO 2007/115299 | 10/2007 |
| WO | WO-2007111247 A1 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010018485 A1 | 2/2010 |
| WO | WO-2010036989 A1 | 4/2010 |
| WO | WO-2011067469 A1 | 6/2011 |
| WO | WO-2011155958 A1 | 12/2011 |

OTHER PUBLICATIONS

"Guitar Hero," in *Wikipedia Online Encyclopedia*. Wikipedia, 2007, Retrieved from the Internet: <URL: http://en.wikipedia.org/w/index.php?title=Guitar_Hero&oldid=137778068>, 4 pages (retrieved on Jul. 3, 2009).

"Rock Band," in *Wikipedia Online Encyclopedia*. Wikipedia, 2007, Retrieved from the Internet: <URL: http://en.wikipedia.org/w/index.php?title=Rock_Band_(video_game)&oldid=137406581>, 2 pages (retrieved on Jul. 3, 2009).

International Search Report issued for PCT/US2010/054300, dated May 31, 2011 (5 pages).

Kuwayama, Y. Trademarks & Symbols, vol. 2: Symbolical Designs, Van Nostrand Reinhold Company, (Nov. 4, 1980). 4 pages.

(56) References Cited

OTHER PUBLICATIONS

Microsoft Office Online Clip Art, http://office.microsoft.com/en-us/clipart/results.aspx?Scope=MC,MM,MP,MS&PoleAssetID=MCJ04316180000&Querty=Icons&CTT=6&Origin=EC01017435m (Feb. 21, 2007) (1 page).
Microsoft PowerPoint Handbook, (1 page) (1992).
Thalmann, "L'animation par ordinateur" http://web.archive.org/web/20060421045510/http://vrlab.epfl.ch/{thalmann/CG/infogr.4.pdf>, Apr. 21, 2006 (52 pages).
Amplitude for Playstation. Retrieved from the Internet: www.target.com/gp/detail.html/601-0682676-9911341?asin=B0000859TM&AFID. Retrieved on Feb. 22, 2005. 1 page.
Amplitude Review by Ryan Davis. Retrieved from the Internet: www.gamespot.com/ps2/puzzle/amplitude/reviews/amplitude-review-6023980.html. Retrieved on Jun. 11, 2012. 10 pages.
Amplitude. Retrieved from the Internet: www.gamesquestdirect.com/71171972582.html. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.html. Retrieved on Jun. 8, 2012. 6 pages.
Association of British Scrabble Players. "Rolling System" ABSP, http://www.absp.org.uk/results/ratings_details.html. Retrieved May 25, 2011 (4 pages).
Beat Planet Music (Import) Review by Christian Nutt. Retrieved from the Internet: www.gamespot.com/gamespot/stories/reviews/0,10867,2546762,00.html. Retrieved on Jun. 11, 2012. 3 pages.
Beatmania IIDX 9 Style. Retrieved from the Internet: www.play-asia.com/paOS-13-71-8g-70-giu.html Retrieved on Feb. 22 2005. 2 pages.
Beatmania PlayStation Review from www.GamePro.com/sony/psx/games/reviews/89.html. Retrieved on Feb. 22, 2005. 1 page.
Beatmania Review. Retrieved from the Internet: www.gamesarefun.com/gamesdb/review.h?reviewid=294. Retrieved on Jun. 11, 2012. 1 page.
Beatmanla IIDX 7 Style. Retrieved from the Internet: www.lik-sang.com/Info.php?category=27&products id=4061. Retrieved on Feb. 22, 2005. 1 page.
Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust a Groove Review by Jeff Gerstmann. Retrieved from the Internet: www.gamespot.com/ps/puzzlelbusta groove/printable_2546923.html. Retrieved on Jun. 11, 2012. 9 pages.
Bust a Groove. Retrieved from the Internet: www.buyritegames.com/product_information.asp?rc=frgl&number=PS-BUSTA2. Retrieved on Feb. 22, 2005. 1 page.
Bust a Groove. Retrieved from the Internet: www.estarland.com/index.asp?page=Playstation.com/playstation.cat.F.product.6257.html Retrieved on Jun. 11, 2012. 2 pages.
Bust a Groove: 989 Studios Best Game of the Year is a Funky Dance Sim That's Got the Fever by Doug Peny. Retrieved from the Internet http://psx.ign.com/articles/152/152308pl.html. Retrieved on Jun. 8, 2012. 5 pages.
BVH File Specification, Character Studio, http://web.archive.org/web/20060321075406/http:/lcharacterstudio. net/bvh file specification.htm, Mar. 21, 2006 (16 pages).
Dance Dance Revolution Review by Andy Chien. Retrieved from the Internet www.gaming-age. com/reviews /archive/old reviews/psx/ddr. Retrieved on Feb. 22, 2005. 3 pages.
Dance Dance Revolution Review by Ryan Davis. Retrieved from the Internet www.gamespot.com/ps/puzzle/dancedancerevolutionfprintable_2699724.html. Retrieved on Jun. 11, 2012. 9 pages.
Dance Dance Revolution, Konami via www.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebx/product/224 789.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/200411031145/www.stepmania.com/stepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prlntable_ 6024297 .html. Retrieved on Jun. 11, 2012. 10 pages.
Def Jam Vendetta. Retrieved from the Internet www.ebgames.com/ebx/product/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://m.ign.com/articles/2003/03/31/def-jam-vendetta-4. Retrieved on Jun. 8, 2012. 6 pages.
Digital Play: Reloaded. Opening Reception. Museum of the Moving Image. Mar. 19, 2005. <http://web.archive.Org/web/20050319060247/ http://www.movingimage.us/site/screenings/contenV2005/digital_play_reloaded.ht ml>. 1 page.
Donkey Konga Review by Ryan Davis. Retrieved from the Internet: www.gamespot.com/gamecube/puzzle/ donkeykonga/printable_ 6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Full Review by Juan Castro. Retrieved from the Internet: cube.ign.com/articles/550/550723pl.html. Retrieved on Jun. 8, 2012. 6 pages.
DrumMania w/ Drum Set. Retrieved from the Internet www.estarland.com/product18126.html Retrieved on Jun. 11, 2012. 2 pages.
DrumMania (Import) Review by Jeff Gerstmann. Retrieved from the Internet: www.gamespot.com/ps2/actionf drummania/printable_ 2546356.html. Retrieved on Jun. 11, 2012. 9 pages.
DrumMania OST. Retrieved from the Internet www.lik-sang.com/info/php?category=264& products id=4793. Retrieved on Feb. 22, 2005. 2 pages.
DrumMania Review by Wyrdwade. Retrieved from the Internet www.gamefaqs.com/ps2/197168-drummania/reviews/review-56573 Retrieved on Jun. 11, 2012. 2 pages.
ESRB Game Ratings: Game Rating & Descriptor Guide via www.esrb.org[online], Retrieved from the Internet: <URL: http://www.esrb.org/ratings/ratings-guide.jsp Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: http:/ps2.ign.corn/articles/507/507854pl.html. Retrieved on Jun. 8, 2012. 8 pages.
Eye Toy: Groove Review by Ryan Davis. Retrieved from the Internet: www.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producL.gsp7dests9999999997&product id=1635738&s. Retrieved on Feb. 22, 2005. 2 pages.

(56) References Cited

OTHER PUBLICATIONS

Frequency Review by Ryan Davis. Retrieved from the Internet:www.gamespot.com/ps2/puzzle/frequency/ printable 2827476.html. Retrieved on Jun. 19, 2012. 9 pages.

Get on Da Mic Overview by Matt Gonzales. Retrieved from the Internet www.gamechronicles.com/reviews/ ps2/getondamic/body.htm. Retrieved on Jun. 11, 2012. 3 pages.

Get on Da Mic Review by Jeff Gerstmann. Retrieved from the Internet www.gamespot.comrri/ps2/puzzle/getondamic/printable 6110242.html. Retrieved on Jun. 11, 2012. 10 pages.

Get on Da Mic. Retrieved from the Internet: www.ebgames.com/ebx/product/245102.asp. Retrieved on Jun. 11, 2012. 2 pages.

Gitaroo Man. Retrieved from the Internet www.estarland.com/playstation2.cat.product.676.html Retrieved on Jun. 14, 2012. 2 pages.

Gitaroo-Man Review by David Smith. Retrieved from the Internet http://p2.ign.com/articles/135/135184p1.html; retrived Jun. 11, 2012. 4 pages.

Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.

Gitaroo-Man. Retrieved from the Internet www.buyritegames.com/productjnformation.asp?re=frgl&number=PS2-GITARO. Retrieved on Feb. 22, 2005. 1 page.

Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.

Guitar Freaks Review by Wade Monnig. Retrieved from the Internet: www.gamesarefun.com/gamesdb/review. php? .reviewid=301. Retrieved on Jun. 11, 2012. 3 pages.

Guitar Freaks Sony. Retrieved from the Internet www.gameexpress.com/product_detail.cfm.?UPC=SCPS45422. Retrieved on Feb. 22, 2005. 1 page.

Guitar Freaks with Guitar. Retrieved from the Internet: www.buyritegames.com/product_information.asp?rc=frgl &number=PSJ-GUilWG. Retrieved on Feb. 22, 2005. 1 page.

Guitar Hero (video game)—Wikipedia, the free encyclopedia—(Publisher—RedOctane) Release Date Nov. 2005. 25 pages.

Guitar Hero—Wikipedia, the free encyclopedia—Nov. 2005. http://en.wikipedia.org/w/index.php?title=guitaryhero &oldid=137778068. Retrieved on May 22, 2012. 5 pages.

GuitarFreaks—Wikipedia, the free encyclopedia—(Publisher—Konami, Konami Digital Entertainment) Release Date 1998. Accessed on Mar. 19, 2009. 5 pages.

International Search Report, PCT/US2006/062287, Mailed on May 10, 2007. 2 pages.

Ipodgames.com Tips. Dec. 4, 2004. <http://web.archive.org/web/20041204032612Awww.ipodgames.com/tips.html > 1 page.

Karaoke Revolution Review by Jeff Gerstmann. Retrieved from the Internet www.gamespot.com/ps2/puzzle/ karaokerevolution/printable ... 6081709.html. Retrieved on Jun. 14, 2012. 10 pages.

Karaoke Revolution. Retrieved from the Internet: www.ebgames.com/ebx/product/24806.asp. Retrieved on Feb. 22, 2005. 2 pages.

Karaoke Revolution: The Revolution will be Televised by Ed Lewis. Retrieved from the Internet: http://ps2.ign.com/articles/458/458064p1.html. Retrieved on Jun. 8, 2012. 7 pages.

Lohman, "Rockstar vs. Guitar Hero," (The Rebel Yell). Nov. 13, 2008, accessed on Mar. 19, 2009. 5 pages.

Mad Maestro!—Pre-Played. Retrieved from the Internet: www.ebgames.com/ebx/product/217604.asp. Retrieved on Feb. 22, 2005. 2 pages.

Mad Maestro! by Ryan Davis. Retrieved from the Internet: www.gamespot.com/ps2/puzzle.madmaestro/ printable_2856821.html. Retrieved on Jun. 19, 2012. 9 pages.

Mad Maestro: The First Orchestra-conducting Sim on US Soil—Is It All It Could Have Been? By David Smith. Retrieved from the Internet http://ps2.ign.com/articles/3551355561 p1.html. Retrieved on Jun. 8, 2012. 6 pages.

Mojib Ribbon Playtest by Anoop Gantayat. Retrieved from the Internet: http://ie.ign.com/articles/442/442204p1.html. Retrieved on Jun. 8, 2012. 4 pages.

Mojib Ribbon—Review. Retrieved from the Internet: www.ntsc-uk.com/review.php?platform=ps2&game=MoiibRibbon. Retrieved on Jun. 14, 2012. 2 pages.

Mojib Ribbon. Retrieved from the Internet: www.lik-sang.com/info.php?category=27&productsid=3805&PHPSESSID=b9eQca. Retrieved on Feb. 22, 2005. 1 page.

Mojib Ribbon. Retrieved from the Internet: www.ncsxshop.com/cgi-bin/shop/SCPS.11033.html. Retrieved on Jun. 14, 2012. 2 pages.

NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).

Non-Final Office Action as issued by the United States Patent and Trademark Office for U.S. Appl. No. 12/474,899, dated Jan. 19, 2011, 7 pages.

PaRappa the Rapper 2. Retrieved from the Internet: www.amazon.com/exec/obidos Retrieved on Feb. 22, 2005. 2 pages.

PaRappa the Rapper Review by Jer Horwitz. Retrieved from the Internet: www.gamespot.com/pslpuzzlel parappatherapper/printable_2548866.html. Retrieved on Jun. 14, 2012. 9 pages.

Parappa the Rapper. Retrieved from the Internet: www.estarland.com/index.asp?page=Playstation&cat=F&product=6871&q. Retrieved on Jun. 11, 2012. 2 pages.

Parappa the Rapper: PaRapper the Rapper Is finally here, but does it live up to the hype? by Adam Douglas. Retrieved from the Internet http://m.ign.com/articles/1997/11/19/parappa-the-rapper Retrieved on Jun. 8, 2012. 2 pages.

PopCap Games Site Review via www.download-free-games.com, retrieved on Mar. 3, 2006]. Retrieved from the Internet <URL:http://www.download-free-games.com/reviews/popcap_games.htm>. 2 pages.

Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.

RedOctane. "Guitar Hero 2 Manual" Activision Publishing, Inc. (2006) (13 pages).

Rez PlayStation$^K$. Retrieved from the internet: http://www.yesasia.com/us/rez-playstation2-the-best-japan-version/1002847668-0-0-cssid. Retrieved on Jun. 14, 2012. 1 page.

Rez Review by Jeff Gerstmann. Retrieved from the Internet:www.qamespot.com/ps2/action/rez/printable 2838815.html. Retrieved on Jun. 11, 2012. 9 pages.

Rez. Retrieved from the Internet: www.estarland.com/playstation2.product.5426.html. Retrieved on Jun. 14, 2012. 2 pages.

Rez: You May Not Understand This Review. We May Not Either. But you should certainly play this game by.David Smith. Retrieved from the Internet: http://m.ign.com/articles/2002/01/09/rez. Retrieved on Jun. 11, 2012. 3 pages.

SingStar Party (SingStar2) Bundle. Retrieved from the Internet: www.gameswarehouse.com.Au/longpage.asp?gameid=10329. Retrieved on Feb. 22, 2005. 2 pages.

SingStar Party. Retrieved from the Internet: www.argos.co.uk/Webapp/wcs/stores/servlet/ProductDisplay?storeId=10001&langld. Retrieved on Feb. 22, 2005. 1 page.

SingStar Review (PS2) by James Hamer-Mortonl. Retrieved from the Internet http://ps2.twomtown.net/en uk/articles/ art.print.php?id=5279. Retrieved on Jun. 11, 2012. 5 pages.

SingStar Review by Luke Van Leuveren. Retrieved from the Internet http://palgn.com.aii/article.php?id-1282. Retrieved on Jun. 11, 2012. 5 pages.

Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.

Space Channel 5. Retrieved from the Internet: www.lik-sang.com/info.php?products_is=2050 &likref=fro_gle4. Retrieved on Feb. 22, 2005. 1 page.

(56) References Cited

OTHER PUBLICATIONS

Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmatters.com/multimedia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet http://games.channel.aol.com/review.adp?qameID-7569. Retrieved on Feb. 22, 2005. 3 pages.
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Virginia Tech Multimedia Music Dictionary, dated May 25, 2011 (7 pages).
Beatnik Patent Sale Offering, Nov. 2008 (81 pp).
Konami Corporation, The computer game "Dance Dance Revolution Max", released in the US by Konami Corporation on Oct. 29, 2002, as evidenced by the game manual. 2 pgs.
Taiko Drum Master Game Manual, Namco Ltd. for PlayStation 2. Oct. 25, 2004. 18 pgs.

\* cited by examiner

SYSTEMS AND METHODS FOR SIMULATING A ROCK BAND EXPERIENCE

CROSS-REFERENCES TO RELATED APPLICATIONS

This application claims benefit of priority to application Ser. No. 61/079,094, filed Jul. 8, 2008 and entitled "Systems and Methods for Simulating a Rock Band Experience" by Egozy et al., the disclosure of which is hereby incorporated herein by reference in its entirety.

FIELD OF THE INVENTION

The present invention relates to rhythm action games, and, more specifically, video games which simulate the experience of playing in a band.

BACKGROUND

Music making is often a collaborative effort among many musicians who interact with each other. One form of musical interaction may be provided by a video game genre known as "rhythm-action," which involves a player performing phrases from a pre-recorded musical composition using a video game's input device to simulate a musical performance. If the player performs a sufficient percentage of the notes or cues displayed, he may score well and win the game. If the player fails to perform a sufficient percentage, he may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win. Two or more players may also play with each other cooperatively. In this mode, players may work together to play a song, such as by playing different parts of a song, either on similar or dissimilar instruments. One example of a rhythm-action game is the GUITAR HERO series of games published by Red Octane and Activision. Another example of a rhythm-action game is the KARAOKE REVOLUTION series of games published by Konami. Still another example is the ROCK BAND game published by Electronic Arts.

SUMMARY OF THE INVENTION

The invention is embodied in various methods, systems, computer program products, and apparatus with means for carrying out the invention. For example, in one aspect, there is a method executed on a game server in signal communication with a game platform. The method begins with receiving a first musical game input data that represents a musical performance of a first group of players. In some embodiments, the group of players play as a persistent band with a band identity carried over from gameplay session to gameplay session, while in other embodiments, the group of players is an ad-hoc group of players that do not play under a persistent band identity and are playing together only for a single gameplay session. The method further includes calculating a first composite score associated with the first musical game input data, and is based on a gameplay challenge. Gameplay challenges are described in more detail below. Then the first composite score is compared to a second composite score associated with a second group of players. The second group of players can also be a persistent band or an ad-hoc group of players.

Similar to the method, there is a system embodying the invention, which includes a game server configured carry out the steps of the method described above. Namely, the game server receives, from a game platform, a first musical game input data representing a musical performance of a first group of players, calculates, a first composite score associated with the first musical game input data, and based on a gameplay challenge, and compares, the first composite score to a second composite score associated with a second group of players.

There is also a computer program product, tangibly embodied in a computer readable storage medium, that includes instructions being operable to cause a data processing apparatus to receive, from a game platform, a first musical game input data representing a musical performance of a first group of players, to calculate a first composite score associated with the first musical game input data, and based on a gameplay challenge, and compare the first composite score to a second composite score associated with a second group of players.

There is also an apparatus in signal communication with a game platform that includes various means for carrying out the invention. Specifically, it includes means for receiving a first musical game input data representing a musical performance of a first group of players such as a network connection and processor configured to interpret the musical game input data. The apparatus also includes means for calculating, e.g., a processor or calculating module, a first composite score associated with the first musical game input data, and based on a gameplay challenge. The apparatus also includes means for comparing, e.g., a processor or comparison module, the first composite score to a second composite score associated with a second group of players.

In any of the aspects above, the second composite score associated with a second musical input data represents a musical performance of the second group and is based on the gameplay challenge. Additionally, in some embodiments, the second composite score (of the second group of players) is stored before the comparison step, allowing the comparison of the performances of the two groups of players to occur asynchronously. In some embodiments, the composite score for the first group of players is also stored in a storage device. Gameplay aspects of either performance can also be stored. Any of the above aspects may also provide the following advantages and benefits.

There is also another aspect executed on a game platform for simulating a competition between a first band and a target score. The aspect involves receiving, by the game platform, a first musical game input data representing a musical performance of a first group of players, calculating a first score for the first group of players based on the first musical game input, receiving a target score based on a gameplay challenge, and then simulating a competition based on the gameplay challenge in substantially real-time between the first group of players and the target score. The target score can be received from a game server, a different game platform, the first group of players, or it can be a stored score. In any of these instances, the target score can represent a score achieved by another band. And, as above, the stored score can be associated with a second musical input data that represents a musical performance of the second band or group and is based on the gameplay challenge.

Additionally, a unit of gameplay based on the gameplay challenge can be determined, as can a per-unit score associated with the target score. A unit of gameplay typically includes a segment of one or more songs, such as a time period in a song, e.g., a phrase or the whole song, which in turn includes one or more musical cues. The per-unit score is typically based on the unit of gameplay and the target score, for example the per-unit score can be an average score per musical cue for the song or phrase. Additionally, an estimated intermediate score can be determined based on the per-unit score and the number of units, e.g., cues, phrases, etc., that have been presented to the first group of players so that it can be determined how a group of players that achieved the target score were performing at a particular point in the song, or phrase, etc. In these scenarios, simulating the competition involves comparing the estimated intermediate score to the first score as the first group of players play. As such, the comparison can be updated based on a change to the first score and typically changes as the first group of players progress through the gameplay challenge. Alternatively, a per-unit score for the first group of players can be determined based on the unit of gameplay, the first score, and a number of units presented to the first group of players, such that simulating the competition involves comparing the per-unit score of the first group of players to the per-unit score associated with the target score. In those scenarios, simulating the competition involves updating the comparison based on a change to the per-unit score for the first group of players.

Gameplay challenges can take various forms. For example, the gameplay challenge can involve performing one or more songs corresponding to a theme. Gameplay challenges can also include one or more constraints which affect performance of the gameplay challenge. Constraints can be, e.g., difficulty level, completion during a particular time period, number of players, maximum number of attempts, type of instrument or instruments to be used, minimum qualifying score, completion of other gameplay, completion of another gameplay challenge, or combinations thereof. Gameplay challenges can also include one or more objectives associated with completion of the gameplay challenge, such as achieving a particular score, achieving a highest score, achieving a lowest score, a particular number of consecutive notes played, a number of bonuses received, a high level of audience enthusiasm, or combinations thereof.

In some embodiments, the gameplay mechanics of sessions during the gameplay challenge can be altered. Altering the mechanics can include making a bonus or reward available during the gameplay challenge that is not available during non-challenge gameplay, removing a bonus or reward during the gameplay challenge that is available during non-challenge gameplay, and penalizing the first or second group of players for failing.

In some implementations, a performance ranking is determined for the first group upon completion of the challenge, with the ranking being based on the first composite score. Typically a winner of the gameplay challenge is determined based on the comparison. In some embodiments, the second group of players is the same as the first group of players and the first group of players is attempting to beat their prior score. In some versions, the composite scores of the first and second groups are based in part on a performance level of each player in the respective groups of players.

In some versions, visual or audio indicators of the performance are utilized to indicate how well the first group of players is performing during the challenge. For example, in versions with speakers are in signal communication with the game platform, the comparison is produced via an audible indicator such as crowd noise, a distortion effect, a volume increase, or combinations thereof. Additionally or alternatively, the comparison can be displayed via a graphical indicator on a display that is in signal and/or electrical communication with the game platform, where the graphical indicator is a score comparison, a performance meter, crowd animation, venue animation, venue lighting, a graphical depiction of the second group of players, changes in mood of player avatars, status messages, or combinations thereof. Alternatively, the graphical indicator can appear as a tug of war between the first group and the second group or the graphical indicator can indicate a score momentum for the first group and second groups. The comparison between the first and second group can also be updated in real time based on a change to the first composite score.

In some implementations, in response to the performance of by the first group of players, additional gameplay challenges are made available to the first group of players. The gameplay challenge and the additional gameplay challenges can then be sorted into tiers. When sorting, a challenge can be assigned to a tier based on the difficulty of one or more songs in the gameplay challenge.

Various methods and means for matching the first and second group for the comparison exist. For example, the matching can include selecting the second group of players based on a performance ranking associated with the gameplay challenge for the second group. Additionally or alternatively, the matching can include selecting the second group of players based on an association between at least one player in the first group of players and at least one player in the second group of players, e.g., a member of one band is a friend of a member of the other band. In some versions, the second group of players is selected based on input from the first group of players. Matching can, however, instead include randomly selecting the second group of players, or selecting the second group of players because they were the group of players to most recently complete the challenge. The second group of players can also be selected based on a performance ranking associated with performance unrelated to the gameplay challenge.

Beneficially, the players in the first and second groups can play together via the same game platform or different game platforms. Specifically, all of the first group of players can provide musical game input data to the same game platform. Alternatively, at least one player from the first group of players provides musical game input data to a game platform different than the game platform of the other players of the first group. The second group of players can also be co-located with the first group or play remotely. For example, the second group of players can provide musical game input data to the same game platform as the first group or the second group of players can provides input data to a game platform different than the game platform of the first group.

In some implementations, it is determined, either by the game server or the game platform depending on implementation, that the game platform has downloaded additional content such as an individual song, an album of songs, a collection of songs by a particular artist or group of artists, or one or more songs in a designated collection. In response to determining the game platform has downloaded content, additional gameplay challenge can be made available to the first group of players. Beneficially, the additional gameplay challenge can include one or more songs of the downloaded content and one or more songs provided by the game platform. Alternatively, an existing gameplay challenge can be modified to include the downloaded content, e.g., based on information contained within the downloaded content such as genre, artist, and the like.

In some embodiments, the gameplay challenge is created by the first group of players. Alternatively, the gameplay challenge can be created by the second group of players. Alternatively, the gameplay challenge can be created by an administrator of a battle-of-the-bands server. Advantageously, an interface is provided for the game platform to access information associated with a gameplay challenge and to allow the groups or administrator to create, alter, or delete challenges.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION

Figure 1A:
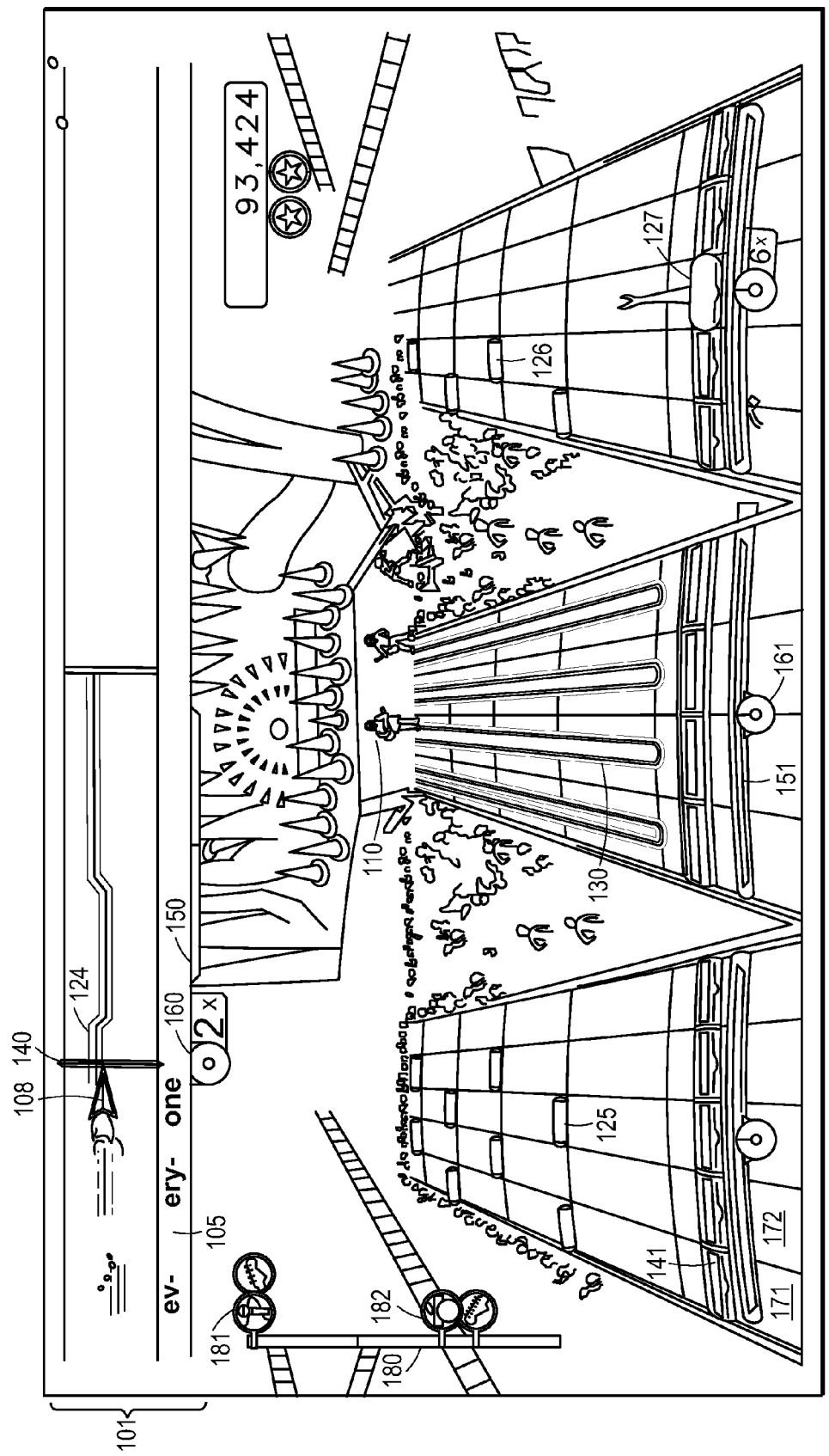
FIG. 1A is an example of one embodiment of a screen display of players emulating a musical performance.

Referring now to FIG. 1A, an embodiment of a screen display for a video game in which four players emulate a musical performance is shown. One or more of the players may be represented on screen by an avatar 110. Although FIG. 1A depicts an embodiment in which four players participate, any number of players may participate simultaneously. For example, a fifth player may join the game as a keyboard player. In this case, the screen may be further subdivided to make room to display a fifth avatar and/or music interface. In some embodiments, an avatar 110 may be a computer-generated image. In other embodiments, an avatar may be a digital image, such as a video capture of a person. An avatar may be modeled on a famous figure or, in some embodiments, the avatar may be modeled on the game player associated with the avatar.

Still referring to FIG. 1A, a lane 101 102 has one or more game "cues" 124, 125, 126, 127, 130 corresponding to musical events distributed along the lane. During gameplay, the cues, also referred to as "musical targets," "gems," or "game elements," appear to flow toward a target marker 140, 141. The cues are distributed on the lane in a manner having some relationship to musical content associated with the game level. For example, the cues may represent note information (gems spaced more closely together for shorter notes and further apart for longer notes), pitch (gems placed on the left side of the lane for notes having lower pitch and the right side of the lane for higher pitch), volume (gems may glow more brightly for louder tones), duration (gems may be "stretched" to represent that a note or tone is sustained, such as the gem 127), articulation, timbre or any other time-varying aspects of the musical content. The cues may be any geometric shape and may have other visual characteristics, such as transparency, color, or variable brightness.

As the gems move along a respective lane, musical data represented by the gems may be substantially simultaneously played as audible music. In some embodiments, audible music represented by a gem is only played (or only played at full or original fidelity) if a player successfully "performs the musical content" by capturing or properly executing the gem. How a player captures the gem depends on the instrument, though generally it involves performing an action with a controller that corresponds to the gem as the gem passes through a target marker (or "Now Bar"). For example, a player may strum a guitar controller's strum bar with one hand while holding down a particular key, e.g., a green key, with a finger of the other hand as a green gem passes over the Now Bar. Or, where the controller imitates a drum, the player strikes a particular drum pad as a gem of the same color as the drum pad passes through or over the Now Bar. In some embodiments, a musical tone is played to indicate successful execution of a musical event by a player. In other embodiments, a stream of audio is played to indicate successful execution of a musical event by a player. In certain embodiments, successfully performing the musical content triggers or controls the animations of avatars or objects in the depicted venue or background.

In other embodiments, the audible music, tone, or stream of audio represented by a cue is modified, distorted, or otherwise manipulated in response to the player's proficiency in executing cues associated with a lane. For example, various digital filters can operate on the audible music, tone, or stream of audio prior to being played by the game player. Various parameters of the filters can be dynamically and automatically modified in response to the player capturing cues associated with a lane, allowing the audible music to be degraded if the player performs poorly or enhancing the audible music, tone, or stream of audio if the player performs well. For example, if a player fails to execute a game event, the audible music, tone, or stream of audio represented by the failed event may be muted, played at less than full volume, or filtered to alter its sound.

In certain embodiments, a "wrong note" sound may be substituted for the music represented by the failed event. Conversely, if a player successfully executes a game event, the audible music, tone, or stream of audio may be played normally. In some embodiments, if the player successfully executes several, successive game events, the audible music, tone, or stream of audio associated with those events may be enhanced or mixed with an additional audio track, for example, by adding an echo or "reverb" to the audible music, or crowd cheers or boos. The filters can be implemented as analog or digital filters in hardware, software, or any combination thereof. Further, application of the filter to the audible music output, which in many embodiments corresponds to musical events represented by cues, can be done dynamically, that is, during play. Alternatively, the musical content may be processed before game play begins. In these embodiments, one or more files representing modified audible output may be created and musical events to output may be selected from an appropriate file responsive to the player's performance.

In addition to modification of the audio aspects of game events based on the player's performance, the visual appearance of those events may also be modified based on the player's proficiency with the game. For example, failure to execute a game event properly may cause game interface elements to appear more dimly. Alternatively, successfully executing game events may cause game interface elements to glow more brightly. Similarly, the player's failure to execute game events may cause their associated avatar or other avatars to appear embarrassed or dejected, while successful performance of game events may cause their associated avatar to appear happy and confident. In other embodiments, successfully executing cues associated with a lane causes the avatar associated with that lane to appear to play an instrument. For example, the drummer avatar will appear to strike the correct drum for producing the audible music. Successful execution of a number of successive cues may cause the corresponding avatar to execute a "flourish," such as kicking their leg, pumping their fist, performing a guitar "windmill," spinning around, winking at the "crowd," or throwing drum sticks. Alternatively, failing or missing a note can likewise cause animations such as a drummer dropping a drum stick when a note is missed.

Player interaction with a cue may be required in a number of different ways. In general, the player is required to provide input when a cue passes under or over a respective one of a set of target markers 140, 141 disposed on the lane. For example, the player associated with lane 102 (lead guitar) may use a specialized controller to interact with the game that simulates a guitar, such as a Guitar Hero SG Controller, manufactured by RedOctane of Sunnyvale, Calif. In this embodiment, the player executes the cue by activating the "strum bar" while pressing the correct fret button of the controller when the cue 125 passes under the target marker 141. In other embodiments, the player may execute a cue by performing a "hammer on" or "pull off," which requires quick depression or release of a fret button without activation of the strum bar. In other embodiments, the player may be required to perform a cue using a "whammy bar" provided by the guitar controller. For example, the player may be required to bend the pitch of a note represented by a cue using the whammy bar. In some embodiments, the guitar controller may also use one or more "effects pedals," such as reverb or fuzz, to alter the sound reproduced by the gaming platform.

In other embodiments, player interaction with a cue may comprise singing a pitch or phoneme or a lyric associated with a cue. For example, the player associated with lane 101 may be required to sing into a microphone to match the pitches indicated by the gem 124 as the gem 124 passes over the target marker 140. As shown in FIG. 1A, the notes of a vocal track are represented by "note tubes" 124. In the embodiment shown in FIG. 1A, the note tubes 124 appear at the top of the screen and flow horizontally, from right to left, as the musical content progresses. In this embodiment, vertical position of a note tube 124 represents the pitch to be sung by the player; the length of the note tube indicates the duration for which the player must hold that pitch. In other embodiments, the note tubes may appear at the bottom or middle of the screen. The arrow 108 provides the player with visual feedback regarding the pitch of the note that is currently being sung. If the arrow is above the note tube 124, the player needs to lower the pitch of the note being sung. Similarly, if the arrow 108 is below the note tube 124, the player needs to raise the pitch of the note being sung. In these embodiments, the vocalist may provide vocal input using a USB microphone of the sort manufactured by Logitech International of Switzerland. In other embodiments, the vocalist may provide vocal input using another sort of simulated microphone. In still further embodiments, the vocalist may provide vocal input using a traditional microphone commonly used with amplifiers. As used herein, a "simulated microphone" is any microphone apparatus that does not have a traditional XLR connector. As shown in FIG. 1A, lyrics 105 may be provided to the player to assist their performance.

In still other embodiments, a player interaction with a cue may comprise any manipulation of any simulated instrument and/or game controller.

As shown in FIG. 1A, each lane may be subdivided into a plurality of segments. Each segment may correspond to some unit of musical time, such as a beat, a plurality of beats, a measure, or a plurality of measures. Although the embodiment shown in FIG. 1A show equally-sized segments, each segment may have a different length depending on the particular musical data to be displayed. In addition to musical data, each segment may be textured or colored to enhance the interactivity of the display. For embodiments in which a lane comprises a tunnel or other shape (as described above), a cursor is provided to indicate which surface is "active," that is, with which lane surface a player is currently interacting. In these embodiments, the viewer can use an input device to move the cursor from one surface to another. As shown in FIG. 1A, each lane may also be divided into a number of sub-lanes, with each sub-lane containing musical targets indicating different input elements. For example, the lane 102 is divided into five sub-lanes, including sub-lanes 171 and 172. Each sub-lane may correspond to a different fret button on the neck of a simulated guitar.

Figure 1B:
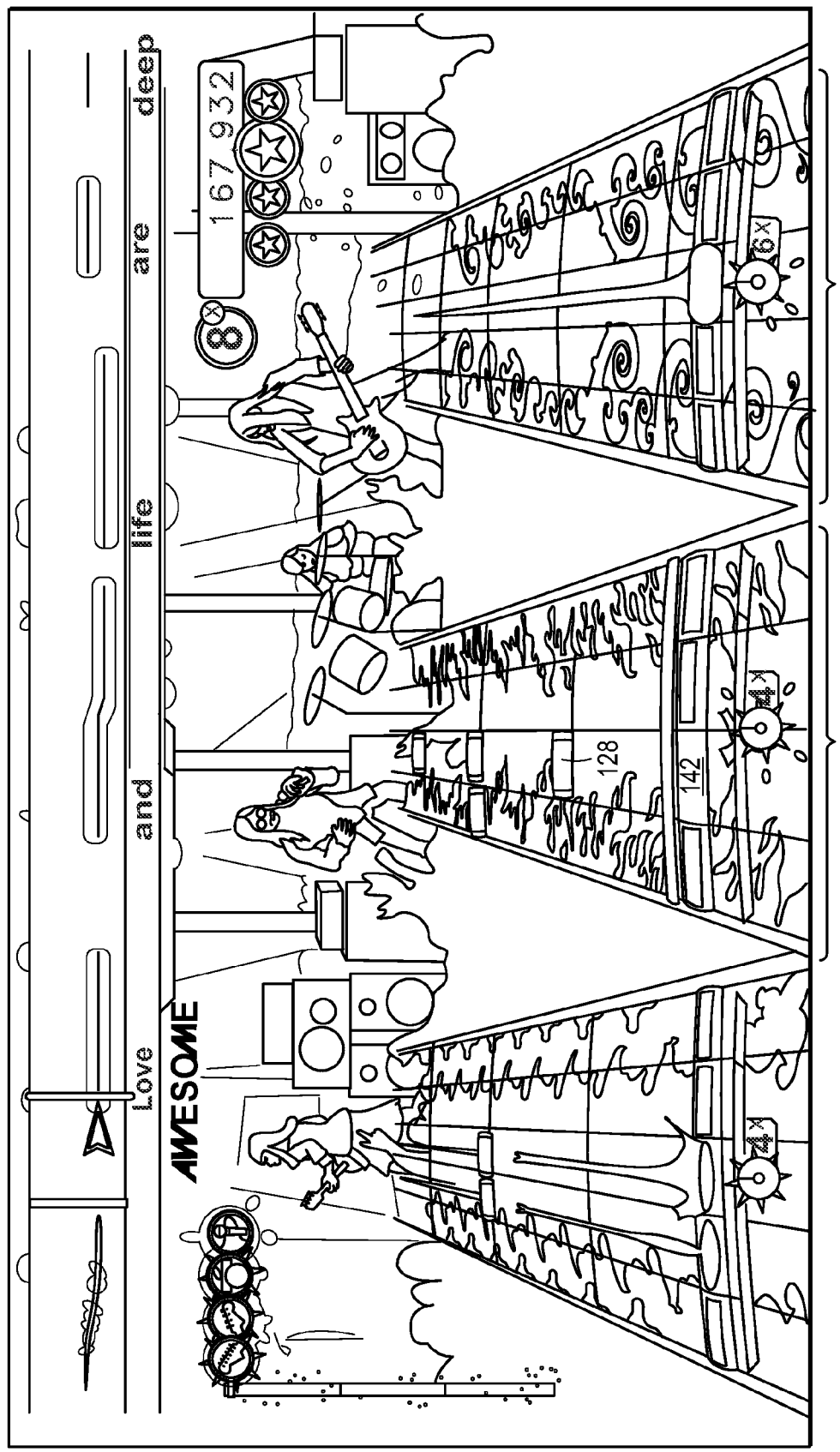
FIG. 1B is a block diagram of a system facilitating network play of a rhythm action game.

Referring now to FIG. 1B, a second embodiment of a screen display for a video game in which four players emulate a musical performance is shown. In the embodiment shown, the lanes 103, 104 have graphical designs corresponding to gameplay events. For example, lane 103 comprises a flame pattern, which may correspond to a bonus activation by the player. For example, lane 104 comprises a curlicue pattern, which may correspond to the player achieving the 6× multiplier shown.

In other embodiments, a game display may alternate the display of one or more avatars and/or the display of the band as a whole. For example, during the performance of a song, a display may switch between a number of camera angles providing, for example, close-ups of the guitarist, bassist, drummer, or vocalist, shots of the band as a whole, shots of the crowd, and/or any combination of the avatars, stage, crowd, and instruments. In some embodiments, the sequence and timing of camera angles may be selected to resemble a music video. In some embodiments, the camera angles may be selected to display an avatar of a player who is performing a distinctive portion of a song. In other embodiments the camera angles may be selected to display an avatar of a player who is performing particularly well or poorly. In some embodiments, an avatar's gestures or actions may correspond to the current camera angle. For example, an avatar may have certain moves, such as a jump, head bang, devil horns, special dance, or other move, which are performed when a close-up of the avatar is shown. In some embodiments, the avatars motions may be choreographed to mimic the actual playing of the song. For example, if a song contains a section where the drummer hits a cymbal crash, the drummer avatar may be shown to hit a cymbal crash at the correct point in the song.

In some embodiments, avatars may interact with the crowd at a venue, and camera angles may correspond to the interaction. For example, in one camera angle, an avatar may be shown pointing at various sections of the crowd. In the next camera angle the various sections of the crowd may be shown screaming, waving, or otherwise interacting with the avatar. In other embodiments, avatars may interact with each other. For example, two avatars may lean back-to-back while performing a portion of a song. Or for example, the entire band may jump up and land simultaneously, and stage pyrotechnics may also be synchronized to the band's move.

In some embodiments, the "lanes" containing the musical cues to be performed by the players may be on screen continuously. In other embodiments one or more lanes may be removed in response to game conditions, for example if a player has failed a portion of a song, or if a song contains an extended time without requiring input from a given player.

Although depicted in FIGS. 1A and 1B, in some embodiments (not shown), instead of a lane extending from a player's avatar, a three-dimensional "tunnel" comprising a number of lanes extends from a player's avatar. The tunnel may have any number of lanes and, therefore, may be triangular, square, pentagonal, hexagonal, heptagonal, octagonal, nonagonal, or any other closed shape. In still other embodiments, the lanes do not form a closed shape. The sides may form a road, trough, or some other complex shape that does not have its ends connected. For ease of reference throughout this document, the display element comprising the musical cues for a player is referred to as a "lane."

In some embodiments, a lane does not extend perpendicularly from the image plane of the display, but instead extends obliquely from the image plane of the display. In further embodiments, the lane may be curved or may be some combination of curved portions and straight portions. In still further embodiments, the lane may form a closed loop through which the viewer may travel, such as a circular or ellipsoid loop.

It should be understood that the display of three-dimensional "virtual" space is an illusion achieved by mathematically "rendering" two-dimensional images from objects in a three-dimensional "virtual space" using a "virtual camera," just as a physical camera optically renders a two-dimensional view of real three-dimensional objects. Animation may be achieved by displaying a series of two-dimensional views in rapid succession, similar to motion picture films that display multiple still photographs per second.

To generate the three-dimensional space, each object in the three-dimensional space is typically modeled as one or more polygons, each of which has associated visual features such as texture, transparency, lighting, shading, anti-aliasing, z-buffering, and many other graphical attributes. The combination of all the polygons with their associated visual features can be used to model a three-dimensional scene. A virtual camera may be positioned and oriented anywhere within the scene. In many cases, the camera is under the control of the viewer, allowing the viewer to scan objects. Movement of the camera through the three-dimensional space results in the creation of animations that give the appearance of navigation by the user through the three-dimensional environment.

A software graphics engine may be provided which supports three-dimensional scene creation and manipulation. A graphics engine generally includes one or more software modules that perform the mathematical operations necessary to "render" the three-dimensional environment, which means that the graphics engine applies texture, transparency, and other attributes to the polygons that make up a scene. Graphics engines that may be used in connection with the present invention include Gamebryo, manufactured by Emergent Game Technologies of Calabasas, Calif., the Unreal Engine, manufactured by Epic Games, and Renderware, manufactured by Criterion Software of Austin, Tex. In other embodiments, a proprietary graphics engine may be used. In many embodiments, a graphics hardware accelerator may be utilized to improve performance. Generally, a graphics accelerator includes video memory that is used to store image and environment data while it is being manipulated by the accelerator.

In other embodiments, a three-dimensional engine may not be used. Instead, a two-dimensional interface may be used. In such an embodiment, video footage of a band can be used in the background of the video game. In others of these embodiments, traditional two-dimensional computer-generated representations of a band may be used in the game. In still further embodiments, the background may be only slightly related, or unrelated, to the band. For example, the background may be a still photograph or an abstract pattern of colors. In these embodiments, the lane may be represented as a linear element of the display, such as a horizontal, vertical, or diagonal element. Additionally or alternatively, the background may be captured, displayed, or rendered as a two-dimensional film.

Still referring to FIG. 1B The player associated with the middle lane 103 (drummer) may also use a specialized controller to interact with the game that simulates a drum kit, such as the DrumMania drum controller, manufactured by Topway Electrical Appliance Co., Ltd. of Shenzhen, China. In some embodiments, the drum controller provides four drum pads and a kick drum pedal. In other embodiments, the drum controller surrounds the player, as a "real" drum kit would do. In still other embodiments, the drum controller is designed to look and feel like an analog drum kit. In these embodiments, a cue may be associated with a particular drum. The player strikes the indicated drum when the cue 128 passes under the target marker 142, to successfully execute cue 128. In other embodiments, a player may use a standard game controller to play, such as a DualShock game controller, manufactured by Sony Corporation.

Referring back to FIG. 1A, in some embodiments, improvisational or "fill" sections may be indicated to a drummer or any other instrumentalist. In FIG. 1A, a drum fill is indicated by long tubes 130 filling each of the sub-lanes of the center lane which corresponds to the drummer.

In some embodiments, a player is associated with a "turntable" or "scratch" track. In these embodiments, the player may provide input using a simulated turntable such as the turntable controller sold by Konami Corporation.

Local play may be competitive or it may be cooperative. Cooperative play is when two or more players work together in an attempt to earn a combined score. Competitive play may be when a player competes against another player in an attempt to earn a higher score. In other embodiments, competitive play involves a team of cooperating players competing against another team of competing players in attempt to achieve a higher team score than the other team. Competitive local play may be head-to-head competition using the same instrument, head-to-head competition using separate instruments, simultaneous competition using the same instrument, or simultaneous competition using separate instruments. In some embodiments, rather than competing for a high score, players or teams may compete for the best crowd rating, longest consecutive correct note streak, highest accuracy, or any other performance metric. In some embodiments, competitive play may feature a "tug-of-war" on a crowd meter, in which each side tries to "pull" a crowd meter in their direction by successfully playing a song. In one embodiment, a limit may be placed on how far ahead one side can get in a competitive event. In this manner, even a side which has been significantly outplayed in the first section of a song may have a chance late in a song to win the crowd back and win the event.

In one embodiment, competition in local play may involve two or more players using the same type of instrument controller to play the game, for example, guitar controllers. In some embodiments, each player associates themselves with a band in order to begin play. In other embodiments, each player can simply play "solo," without association with a band. In these embodiments, the other instruments required for performance of a musical composition are reproduced by the gaming platform. Each of the players has an associated lane and each player is alternately required to perform a predetermined portion of the musical composition. Each player scores depending on how faithfully he or she reproduces their portions of the musical composition. In some embodiments, scores may be normalized to produce similar scores and promote competition across different difficulty levels. For example, a guitarist on a "medium" difficulty level may be required to perform half of the notes as a guitarist on a "hard" difficulty level and, as such, should get 100 points per note instead of 50. An additional per-difficulty scalar may be required to make this feel "fair."

This embodiment of head-to-head play may be extended to allow the players to use different types of game controllers and, therefore, to perform different portions of the musical composition. For example, one player may elect to play using a guitar-type controller while a second player may play using a drum-type controller. Alternatively, each player may use a guitar-type controller, but one player elects to play "lead guitar" while the other player elects to play "rhythm guitar" or, in some embodiments, "bass guitar." In these examples, the gaming platform reproduces the instruments other than the guitar when it is the first player's turn to play, and the lane associated with the first player is populated with gems representing the guitar portion of the composition. When it is time for the second player to compete, the gaming platform reproduces the instruments other than, for example, the drum part, and the second player's lane is populated with gems representing the drum portion of the musical composition. In some of these embodiments, a scalar factor may be applied to the score of one of the player's to compensate for the differences in the parts of the musical composition.

In still other embodiments, the players may compete simultaneously, that is, each player may provide a musical performance at the same time as the other player. In some embodiments, both players may use the same type of controller. In these embodiments, each player's lane provides the same pattern of cues and each player attempts to reproduce the musical performance identified by those elements more faithfully than the other player. In other embodiments, the players use different types of controllers. In these embodiments, one player attempts to reproduce one portion of a musical composition while the other player tries to represent a different portion of the same composition.

In any of these forms of competition, the relative performance of a player may affect their associated avatar. For example, the avatar of a player that is doing better than the competition may, for example, smile, look confident, glow, swagger, "pogo stick," etc. Conversely, the losing player's avatar may look depressed, embarrassed, etc.

Instead of competing, the players may cooperate in an attempt to achieve a combined score. In these embodiments, the score of each player contributes to the score of the team, that is, a single score is assigned to the team based on the performance of all players. As described above, a scalar factor may be applied to the score of one of the player's to compensate for the differences in the parts of the musical composition.

Still referring to FIG. 1A, an indicator of the performance of a number of players on a single performance meter 180 is shown. In brief overview, each of the players in a band may be represented by an icon 181, 182. In the figure shown the icons 181 182 are circles with graphics indicating the instrument the icon corresponds to. For example, the icon 181 contains a microphone representing the vocalist, while icon 182 contains a drum set representing the drummer. The position of a player's icon on the meter 180 indicates a current level of performance for the player. A colored bar on the meter may indicate the performance of the band as a whole. Although the meter shown displays the performance of four players and a band as a whole, in other embodiments, any number of players or bands may be displayed on a meter, including two, three, four, five, six, seven, eight, nine, or ten players, and any number of bands.

Calculating a player score representing the performance of each player may be done according to any metric. In some embodiments, a weighted rolling average of a player's performance may be used. For example, a player's position on the meter may reflect a percentage of notes successfully hit, where more recent notes are weighted more heavily than less recent notes. In another embodiment, a player's position on the meter may be calculated by computing a weighted average of the player's performance on a number of phrases. In some embodiments, a player's position on the meter may be updated on a note-by-note basis. In other embodiments, a player's position on the meter may be updated on a phrase-by-phrase basis. The meter may also indicate any measure of a band's performance. In some embodiments, the meter may display the band's performance as an average of each of the players' performances. In other embodiments, the indicated band's performance may comprise a weighted average in which some players' performances are more heavily weighted.

In some embodiments, a single meter 180 may be used to display the performance level of multiple players as well as a band as a whole. A band composite performance level may be computed in any manner. In some embodiments, a band performance level may comprise an average of the performance of each player in the band. In other embodiments, a band performance level may comprise a weighted average of the performance of each player in the band, with weights being assigned based on difficulty of parts, amount of notes played recently, and/or any bonuses triggered.

A band performance level may be shown on a meter 180 in any manner. In some embodiments, the meter 180 may comprise subdivisions which indicate relative levels of performance. For example, in the embodiment shown, the meter 180 is divided roughly into thirds, which may correspond to Good, Average, and Poor performance. In some embodiments, a band performance level may be represented as a line or bar on a meter 180. In other embodiments, a band performance level may be represented as an icon or text on a meter 180. In the embodiment shown in FIG. 1D, a filled bar indicates the band's performance as a whole. In some embodiments, individual performances may not be indicated on a meter, and only the performance of the band as a whole may be displayed.

In some embodiments, a player or players in a band may "fail" a song if their performance falls to the bottom of the meter. In some embodiments, consequences of failing a song may include being removed from the rest of the song. In these embodiments, a player who has failed may have their lane removed from the display, and the audio corresponding to that player's part may be removed. In some embodiments, if a single member of a band fails a song, the band may consequently fail the song. In other embodiments, if a member of a band fails a song, one or more other members of the band may continue playing. In still other embodiments, one or more other members of a band may reinstate the failed player.

Individual player performance levels may be indicated on a meter in any manner. In the embodiment shown in FIG. 1A, the icons 181, 182 displayed to indicate each player may comprise any graphical or textual element. In some embodiments, the icons may comprise text with the name of one or more of the players. In another embodiment the icon may comprise text with the name of the instrument of the player. In other embodiments, the icons may comprise a graphical icon corresponding to the instrument of the player. For example, an icon containing a drawing of a drum 182 may be used to indicate the performance of a drummer.

Although described above in the context of a single player providing a single type of input, a single player may provide one or more types of input simultaneously. For example, a single player providing instrument-based input (such as for a lead guitar track, bass guitar track, rhythm guitar track, keyboard track, drum track, or other percussion track) and vocal input simultaneously.

Still referring to FIG. 1A, meters 150, 151 may be displayed for each player indicating an amount of stored bonus. The meters may be displayed graphically in any manner, including a bar, pie, graph, or number. In some embodiments, each player may be able to view the meters of remote players. In other embodiments, only bonus meters of local players may be shown. Bonuses may be accumulated in any manner including, without limitation, by playing specially designated musical phrases, hitting a certain number of consecutive notes, or by maintaining a given percentage of correct notes.

In some embodiments, if a given amount of bonuses are accumulated, a player may activate the bonus to trigger an in-game effect. An in-game effect may comprise a graphical display change including, without limitation, an increase or change in crowd animation, avatar animation, performance of a special trick by the avatar, lighting change, setting change, or change to the display of the lane of the player. An in-game effect may also comprise an aural effect, such as a guitar modulation, including feedback, distortion, screech, flange, wah-wah, echo, or reverb, a crowd cheer, an increase in volume, and/or an explosion or other aural signifier that the bonus has been activated. An in-game effect may also comprise a score effect, such as a score multiplier or bonus score addition. In some embodiments, the in-game effect may last a predetermined amount of time for a given bonus activation.

In some embodiments, bonuses may be accumulated and/or deployed in a continuous manner. In other embodiments, bonuses may be accumulated and/or deployed in a discrete manner. For example, instead of the continuous bar shown in FIG. 1A, a bonus meter may comprise a number of "lights" each of which corresponds to a single bonus earned. A player may then deploy the bonuses one at a time.

In some embodiments, bonus accumulation and deployment may be different for each simulated instrument. For example, in one embodiment only the bass player may accumulate bonuses, while only the lead guitarist can deploy the bonuses.

FIG. 1A also depicts score multiplier indicators 160, 161. A score multiplier indicator 160, 161 may comprise any graphical indication of a score multiplier currently in effect for a player. In some embodiments, a score multiplier may be raised by hitting a number of consecutive notes. In other embodiments, a score multiplier may be calculated by averaging score multipliers achieved by individual members of a band. For example, a score multiplier indicator 160, 161 may comprise a disk that is filled with progressively more pie slices as a player hits a number of notes in a row. Once the player has filled the disk, the player's multiplier may be increased, and the disk may be cleared. In some embodiments, a player's multiplier may be capped at certain amounts. For example, a drummer may be limited to a score multiplier of no higher than 4×. Or for example, a bass player may be limited to a score multiplier of no higher than 6×.

In some embodiments, a separate performance meter (not shown) may be displayed under the lane of each player. This separate performance meter may comprise a simplified indication of how well the player is doing. In one embodiment, the separate performance meter may comprise an icon which indicates whether a player is doing great, well, or poorly. For example, the icon for "great" may comprise a hand showing devil horns, "good" may be a thumbs up, and "poor" may be a thumbs down. In other embodiments, a player's lane may flash or change color to indicate good or poor performance.

Each player may use a gaming platform in order to participate in the game. In one embodiment, the gaming platform is a dedicated game console, such as: PLAYSTATION2, PLAYSTATION3, or PLAYSTATION PERSONAL, manufactured by Sony Corporation; DREAMCAST, manufactured by Sega Corp.; GAMECUBE, GAMEBOY, GAMEBOY ADVANCE, or WII, manufactured by Nintendo Corp.; or XBOX or XBOX360, manufactured by Microsoft Corp. In other embodiments, the gaming platform comprises a personal computer, personal digital assistant, or cellular telephone. In some embodiments, the players associated with avatars may be physically proximate to one another. For example, each of the players associated with the avatars may connect their respective game controllers into the same gaming platform ("local play").

Figure 1C:
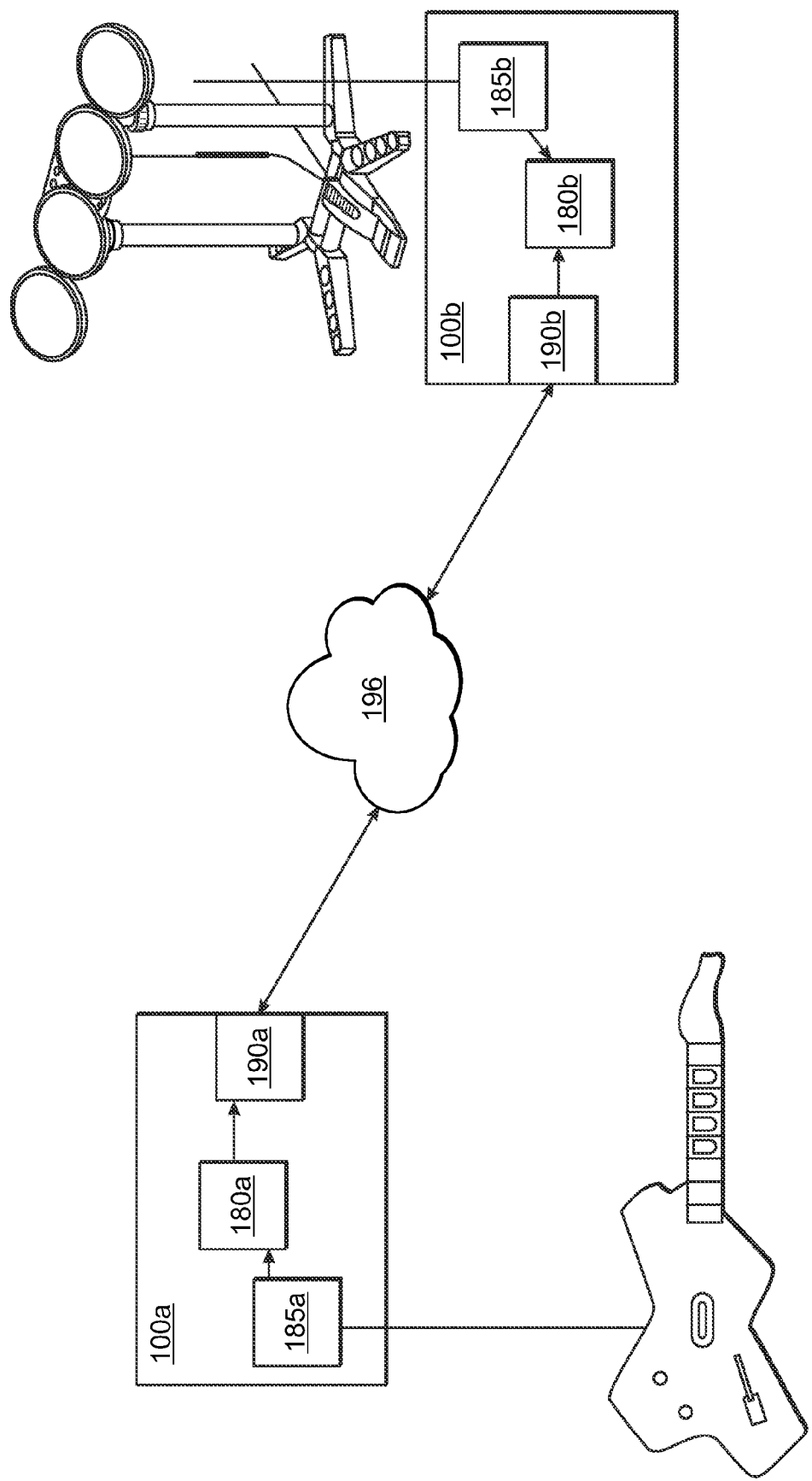
FIG. 1C is a example of one embodiment of a screen display for remote multiplayer play.

In some embodiments, one or more of the players may participate remotely. FIG. 1C depicts a block diagram of a system facilitating network play of a rhythm action game. As shown in FIG. 1C, a first gaming platform 100*a* and a second gaming platform 100*b* communicate over a network 196, such as a local area network (LAN), a metropolitan area network (MAN), or a wide area network (WAN) such as the Internet or the World Wide Web. The gaming platforms connect to the network through one of a variety of connections including standard telephone lines, LAN or WAN links (e.g., T1, T3, 56 kb, X.25), broadband connections (e.g., ISDN, Frame Relay, ATM), and wireless connections (e.g., 802.11a, 802.11g, Wi-Max). The first gaming platform 100*a* and the second gaming platform 100*b* may be any of the types of gaming platforms identified above. In some embodiments, the first gaming platform 100*a* and the second gaming platform 100*b* are of different types.

When a networked multiplayer game session begins at the direction of one of the players, that player's gaming platform 100*a* (the "host") transmits a "start" instruction to all other gaming platforms participating in the networked game, and the game begins on all platforms. A timer begins counting on each gaming platform, each player's game cues are displayed, and each player begins attempting to perform the musical composition.

Gameplay on gaming platform 100*a* is independent from game play on gaming platform 100*b*, except that each player's gaming platform contains a local copy of the musical event data for all other players. The timers on the various gaming platforms communicate with each other via the network 196 to maintain approximate synchrony using any number of the conventional means known in the art.

The gaming platforms 100*a*, 100*b* also continually transmit game score data to each other, so that each system (and player) remains aware of the game score of all other systems (and players). Similarly, this is accomplished by any number of means known in the art. Note that this data is not particularly timing sensitive, because if there is momentary disagreement between any two gaming platforms regarding the score (or similar game-related parameters), the consequences to gameplay are negligible.

In one embodiment, as each player plays the game at their respective location, an analyzer module 187a, 187b on that player's gaming platform 100a, 100b continually extracts data from an event monitor 185a, 185b regarding the local player's performance, referred to hereafter as "emulation data". Emulation data may include any number of parameters that describe how well the player is performing. Some examples of these parameters include:

whether or not the most recent event type was a correctly-played note or an incorrectly-played noted;

a timing value representing the difference between actual performance of the musical event and expected performance of the musical event;

a moving average of the distribution of event types (e.g., the recent ratio of correct to incorrect notes);

a moving average of the differences between the actual performance of musical events and the expected performance times of the musical events; or a moving average of timing errors of incorrect notes.

Each analyzer module 187a, 187b continually transmits the emulation data it extracts over the network 196 using transceiver 190a, 190b; each event monitor 185a, 185b continually receives the other gaming platform's emulation data transmitted over the network 196.

In one embodiment, the emulation data essentially contains a statistical description of a player's performance in the recent past. The event monitor 185a, 185b uses received emulation data to create a statistical approximation of the remote player's performance.

In one particular example, an incoming emulation parameter from a remote player indicates that the most recent remote event was correctly reproduced. When the local event monitor 185a, 185b reaches the next note in the local copy of the remote player's note data, it will respond accordingly by "faking" a successfully played note, triggering the appropriate sound. That is, the local event monitor 185a, 185b will perform the next musical event from the other players' musical event data, even though that event was not necessarily actually performed by the other player's event monitor 185a, 185b. If instead the emulation parameter had indicated that the most recent remote event was a miss, no sound would be triggered.

In another particular example, an incoming emulation parameter from a remote player indicates that, during the last 8 beats, 75% of events were correctly reproduced and 25% were not correctly reproduced. When the local event monitor 185a reaches the next note in the local copy of the remote player's note data, it will respond accordingly by randomly reproducing the event correctly 75% of the time and not reproducing it correctly 25% of the time.

In another particular example, an incoming emulation parameter from a remote player indicates that, during the last 4 beats, 2 events were incorrectly performed, with an average timing error of 50 "ticks." The local event monitor 185a, 185b will respond accordingly by randomly generating incorrect events at a rate of 0.5 misses-per-beat, displacing them in time from nearby notes by the specified average timing error.

The above three cases are merely examples of the many types of emulation parameters that may be used. In essence, the remote player performances are only emulated (rather than exactly reproduced) on each local machine.

In this embodiment, the analyzer module 187a, 187b may extract musical parameters from the input and transmit them over a network 196 to a remote gaming platform. For example, the analyzer module 187a, 187b may simply transmit the input stream over a network 196 or it may extract the information into a more abstract form, such as "faster" or "lower." Although described in the context of a two-player game, the technique may be used with any number of players.

Still referring to FIG. 1C, in another embodiment, analyzer module 187a, 187b extracts data from the event monitor 185a, 185b regarding the local player's performance. In this embodiment, however, the extracted data is transmitted over the network 196 using the transceiver 190a, 190b. When the analyzer 187a, 187b receives the transmitted data, it generates an emulation parameter representing the other player's musical performance and provides the locally-generated emulation parameter to the event monitor 185a, 185b, as described above. One advantage of this embodiment is that each player may locally set their preference for how they want the event monitor 185a, 185b to act on emulation parameters.

In other embodiments, the transmitted data is associated with a flag that indicates whether the transmitted data represents a successfully executed musical event or an unsuccessfully executed musical event. In these embodiments, the analyzer 187a, 187b provides a locally-generated emulation parameter to the event monitor 185a, 185b based on the flag associated with the transmitted data.

One unusual side effect of these techniques is that each local player does not hear an exact reproduction of the remote players' performances; only a statistical approximation. However, these statistical approximations have two countervailing positive attributes: because they are synchronized to the local player's timer and the local copy of the remote players' note data, they are synchronous with the local player's performance; and while not exact reproductions, they are "close enough" to effectively communicate to the local player the essence of how well the remote players are performing musically. In this model, delays in the transmission of the data over the network 196 do not have the intolerable side effect of causing cacophonous asynchronicity between the note streams triggering sounds on each player's local system.

In other embodiments, a central server may be used to facilitate communication between the gaming platforms 100a, 100b. Extraction of emulation parameters is performed, as described above. The server distributes data, whether music performance data or emulation parameter data, to all other gaming platforms participating in the current game. In other embodiments, the server may store received data for use later. For example, a band may elect to use the stored data for the performance of a band member who is unavailable to play in a specific game.

Figure 1D:
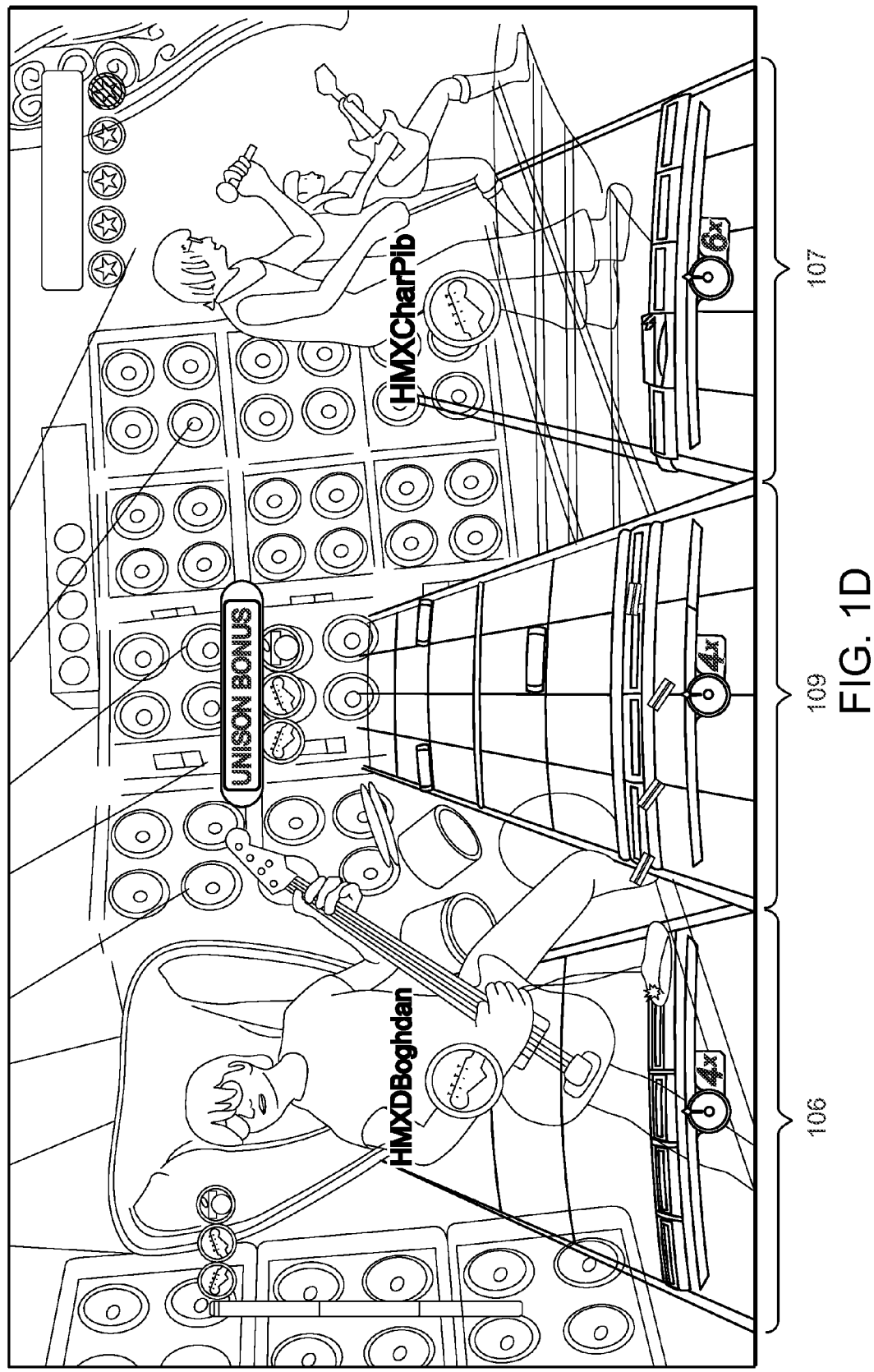
FIG. 1D depicts an indicator of the performance of a number of players on a single performance meter.

Referring now to FIG. 1D, one embodiment of a screen display for remote multiplayer play is shown. The embodiment of the screen display shown in FIG. 1D may be used for head-to-head play, for simultaneous competition, and for cooperative play. As shown in FIG. 1D, a local player's lane 109 is shown larger than the lanes 106 107 of two remote players. The avatars for remote players may appear normally on stage in a similar manner as if the avatars represented local players. In other embodiments, the lanes may be displayed in a similar manner for both local multiplayer and remote multiplayer. In still other embodiments, in remote multiplayer, only the local player or player's avatars may be shown.

As shown in FIG. 1D, the lanes 106, 107 associated with the remote players are shown smaller than the local player's lane 109. In other embodiments, the lanes of one or more remote players may be graphically distinguished in any other way. For example, the remote players' lanes may be shown translucently. Or for example, the remote players' lanes may have a higher transparency than local player's lanes. Or the remote players' lanes may be shown in grayscale, or in a different screen location than local players' lanes. In some embodiments, a remote vocalist's lane may not be shown at all, and instead only the lyrics of the song may be displayed.

In some embodiments, multiple players participate in an online face-off between two bands. A "band" is two or more players that play in a cooperative mode. In some embodiments, the two bands need to have the same types of instruments at the same difficulty level selection, e.g., a guitarist playing on "hard" and a bassist playing on "medium" playing against a guitarist playing on "hard" and a bassist playing on "medium." In other embodiments, the two bands still need to have the same types of instruments but the difficulty selections can be different: Players participating at a lower difficulty level simply have fewer gems to contribute to the overall score. The song to be played may be selected after the teams have been paired up. Alternatively, a band may publish a challenge to play a particular song and a team may accept the challenge.

For example, a local group of players may formed a band and give their band a name ("The Freqs."). Each of the four players in the "The Freqs" is local to one another. They may then competing against a team of players located remotely, who have formed a band called "The Champs." In some cases "The Champs" may each be local to one another. In other cases, members of "The Champs" may be remote to each other. Each player in "The Freqs" and "the Champs" may see a display similar to FIG. 1A or FIG. 1B. However, in some embodiments, an additional score meter may be displayed showing the score of the other band. In other embodiments, any other measure and indication of performance of a band may be given. For example, in some embodiments, meters may be displayed for each band indicating relative performance, crowd engagement, percentage of notes hit, or any other metric. In some embodiments, a four-in-one meter 180 as depicted in FIG. 1A may be displayed for each band. In some embodiments, avatars from both bands may be depicted on the stage.

In some embodiments, the bands "trade" alternating portions of the musical composition to perform; that is, the performance of the song alternates between bands. In these embodiments, musical performance output from "The Champs" is reproduced locally at the gaming platform used by "The Freqs" when "The Champs" are performing. Similarly, the musical performance of "The Freqs" is reproduced remotely (using the emulation parameter technique described above) at the gaming platform of "The Champs" when "The Freqs" are performing. In other embodiments, the bands play simultaneously. In these embodiments, the displayed score may be the only feedback that "The Freqs" are provided regarding how well "The Champs" are performing.

In some particular embodiments, members of cooperating bands may be local to one another or remote from one another. Similarly, members of competing bands may be local to one another or remote from one another. In one example, each player is remote from every other player.

In some embodiments, players may form persistent bands. In these embodiments, those bands may only compete when at least a majority of the band in available online. In some of the embodiments, if a member of a persistent band in not online and the other band members want to compete, a gaming platform may substitute for the missing band member.

Alternatively, a player unaffiliated with the band may substitute for the missing band member. In still other embodiments, a stream of emulation parameters stored during a previous performance by the missing band member may be substituted for the player. In other embodiments, an online venue may be provided allowing players to form impromptu bands. Impromptu bands may dissolve quickly or they may become persistent bands.

Although FIGS. 1A, 1B, and 1D show a band comprising one or more guitars, a drummer, and a vocalist, a band may comprise any number of people playing any musical instruments. Instruments that may be simulated and played in the context of a game may include, without limitation, any percussion instruments (including cymbals, bell lyre, celeste, chimes, crotales, glockenspiel, marimba, orchestra bells, steel drums, timpani, vibraphone, xylophone, bass drum, crash cymbal, gong, suspended cymbal, tam-tam, tenor drum, tom-tom, acme siren, bird whistle, boat whistle, finger cymbals, flex-a-tone, mouth organ, marching machine, police whistle, ratchet, rattle, sandpaper blocks, slapstick, sleigh bells, tambourine, temple blocks, thunder machine, train whistle, triangle, vibra-slap, wind machine, wood block, agogo bells, bongo drum, cabaca, castanets, claves, conga, cowbell, maracas, scraper, timbales, kick drum, hi-hat, ride cymbal, sizzle cymbal, snare drum, and splash cymbal), wind instruments (including piccolo, alto flute, bass flute, contraalto flute, contrabass flute, subcontrabass flute, double contrabass flute, piccolo clarinet, sopranino clarinet, soprano clarinet, basset horn, alto clarinet, bass clarinet, contra-alto clarinet, contrabass clarinet, octocontra-alto clarinet, octocontrabass clarinet, saxonette, soprillo, sopranino saxophone, soprano saxophone, conn-o-sax, clar-o-sax, saxie, mezzo-soprano saxophone, alto saxophone, tenor saxophone, baritone saxophone, bass saxophone, contrabass saxophone, subcontrabass saxophone, tubax, aulochrome, tarogato, folgerphone, contrabassoon, tenoroon, piccolo oboe, oboe d'amore, English horn, French horn, oboe de caccia, bass oboe, baritone oboe, contrabass oboe, bagpipes, bugle, cornet, didgeridoo, euphonium, flugelhorn, shofar, sousaphone trombone, trumpet, tuba, accordion, concertina, harmonica, harmonium, pipe organ, voice, bullroarer, lasso d'amore, whip and siren), other stringed instruments (including harps, dulcimer, archlute, arpeggione, banjo, cello, Chapman stick, cittern, clavichord, double bass, fiddle, slide guitar, steel guitar, harpsichord hurdy gurdy, kora, koto, lute, lyre, mandola, mandolin, sitar, ukulele, viola, violin, and zither) keyboard instruments (including accordion, bandoneon, calliope, carillon, celesta, clavichord, glasschord, harpsichord, electronic organ, Hammond organ, pipe organ, MIDI keyboard, baby grand piano, electric piano, grand piano, janko piano, toy piano, upright piano, viola organista, and spinets) or electronic instruments or effects device such as a turntable.

Figure 2A:
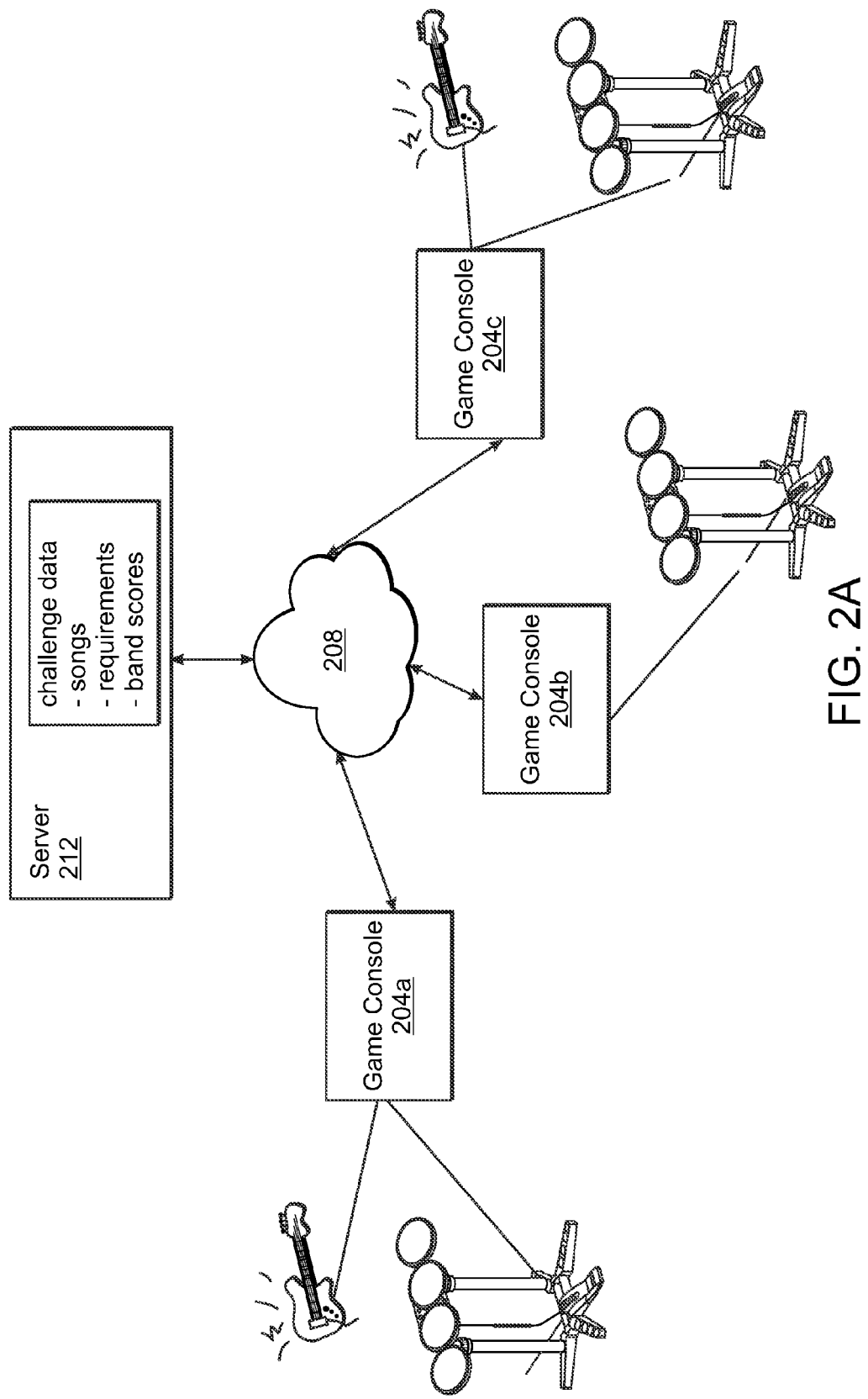
FIG. 2A is a block diagram depicting one embodiment of a system for providing asynchronous battle-of-the-bands gameplay.

Referring now to FIG. 2A, a block diagram of one embodiment of a system for providing asynchronous battle-of-the-bands gameplay is shown. In brief overview, one or more consoles 204a, 204b, 204c (collectively 204) are connected via one or more networks 208 to a central server 212. The central server 212 hosts battle-of-the-bands challenges which can be accessed by the consoles 204. The consoles 204 may access challenges at any time, regardless of the activity of any of the other consoles 204. Asynchronous battle-of-the-bands gameplay may be provided with respect to any of the challenges by having the central server 212 store aspects of a first bands performance on a particular challenge. As a second band begins, or alternatively, performs, the challenge, they may be pitted against the first band, and be shown a running indication of how their performance compares to that of the first band.

Still referring to FIG. 2A, now in greater detail, a central server 210 may provide one or more challenges which can be accessed in a battle-of-the-bands mode. A challenge may comprise any song or set of songs which must be played by a band to complete the challenge. In some embodiments, the song or set of songs may correspond to a given theme or classification, such as songs from a particular decade, a set of songs from a particular band, or a set of songs of a particular genre. A challenge may comprise one, two, three, four, five, six, or any number of songs.

In some embodiments, a challenge may specify one or more constraints on the way in which the set of songs must be played. For example, the challenge may require a band with a particular instrumentation. For example, the challenge may require a guitar, bass, drum, and vocal part all be played. Or for example, a challenge may require that only guitar and vocals must be played. In some embodiments, a challenge may require that the set of songs be played during a given time period. For example, a challenge may be posted for one week, such that any bands wishing to compete must complete the challenge within the week. Or for example, a challenge may be posted only on a single day.

In some embodiments, the challenge may require that the songs be played at, above, and/or below a specified difficulty level. For example, a challenge may require that all parts be played on a "hard" difficulty level. Or for example, a challenge may be geared to novices, and require that all songs be played at a medium or easier difficulty level.

In some embodiments, a challenge may require a band to have particular qualifications. For example, a challenge may require that a band have unlocked or downloaded a particular song or set of songs during other gameplay. Or for example, a challenge may require that a band have scored above a given threshold on a particular song or set of songs to qualify for the challenge.

In some embodiments, a band may be limited in the number of times it can attempt a given challenge. For example, a band may be limited to attempting a challenge only once. Or for example, a band may be limited to only attempting a particular challenge five times. In other embodiments, a band may attempt a given challenge any number of times.

A challenge may have any objective, including without limitation achieving the highest score, achieving a lowest score, achieving the highest consecutive-note streak, achieving a lowest consecutive-note streak, earning the most bonuses, and/or maintaining the highest level of audience enthusiasm, As or after a band executes a challenge, any aspects of the band's performance may be saved on the central server to facilitate determining a winner of the challenge, and providing any of the battle-of-the-bands features described.

In some embodiments, gameplay in a challenge may be altered from gameplay outside a challenge. For example, certain bonuses may be enabled that are not available in non-challenge gameplay, or vice versa. Or for example, in a challenge, a band may be able to carry over bonuses and note streaks from song to song. In some embodiments, a special penalty may be assessed if a band fails a song that is part of a challenge. For example, a penalty of 10,000 points may be assessed, and the song may be restarted.

In some embodiments, bands matched in a battle-of-the-bands competition may be local to each other—that is, both bands perform on the same game console. In other embodiments, matched bands may be remote to each other—that is, each band performs on a different game console. In some embodiments, a band competing in a challenge may have all its members local to each other. In other embodiments, a band competing in a challenge may have one or more remote members.

Figure 2B:
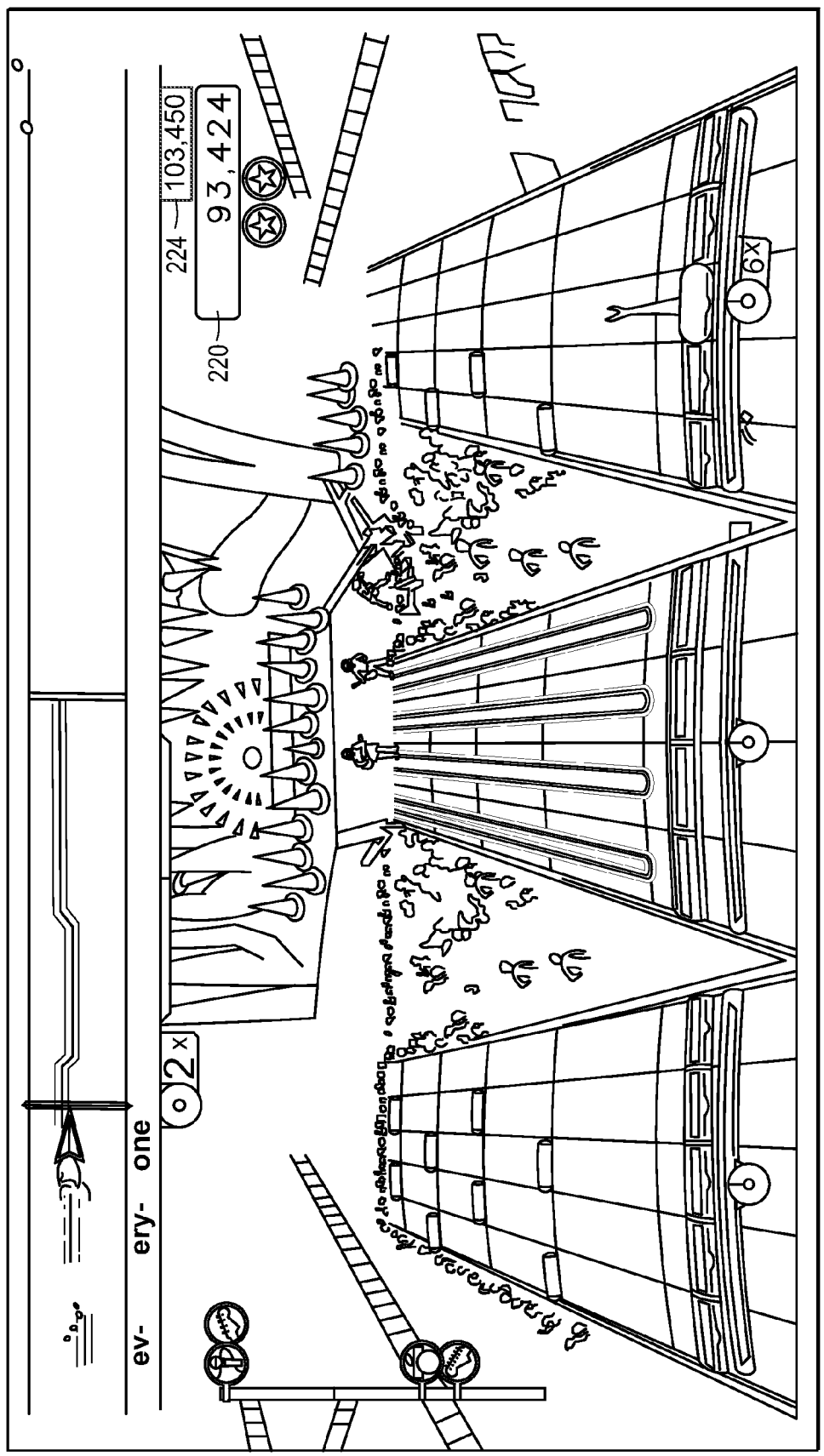
FIG. 2B is an exemplary screenshot of a band competing on a challenge in a battle-of-the-bands mode.

Referring now to FIG. 2B, an example screenshot of a band competing on a challenge in a battle-of-the-bands mode is shown. In brief overview, a guitarist, vocalist, bassist, and drummer are performing a song. The band's total score 220 for the challenge to this point is displayed. Also displayed is a running score 224 for another band that the band has been selected to compete against.

Figure 2C:
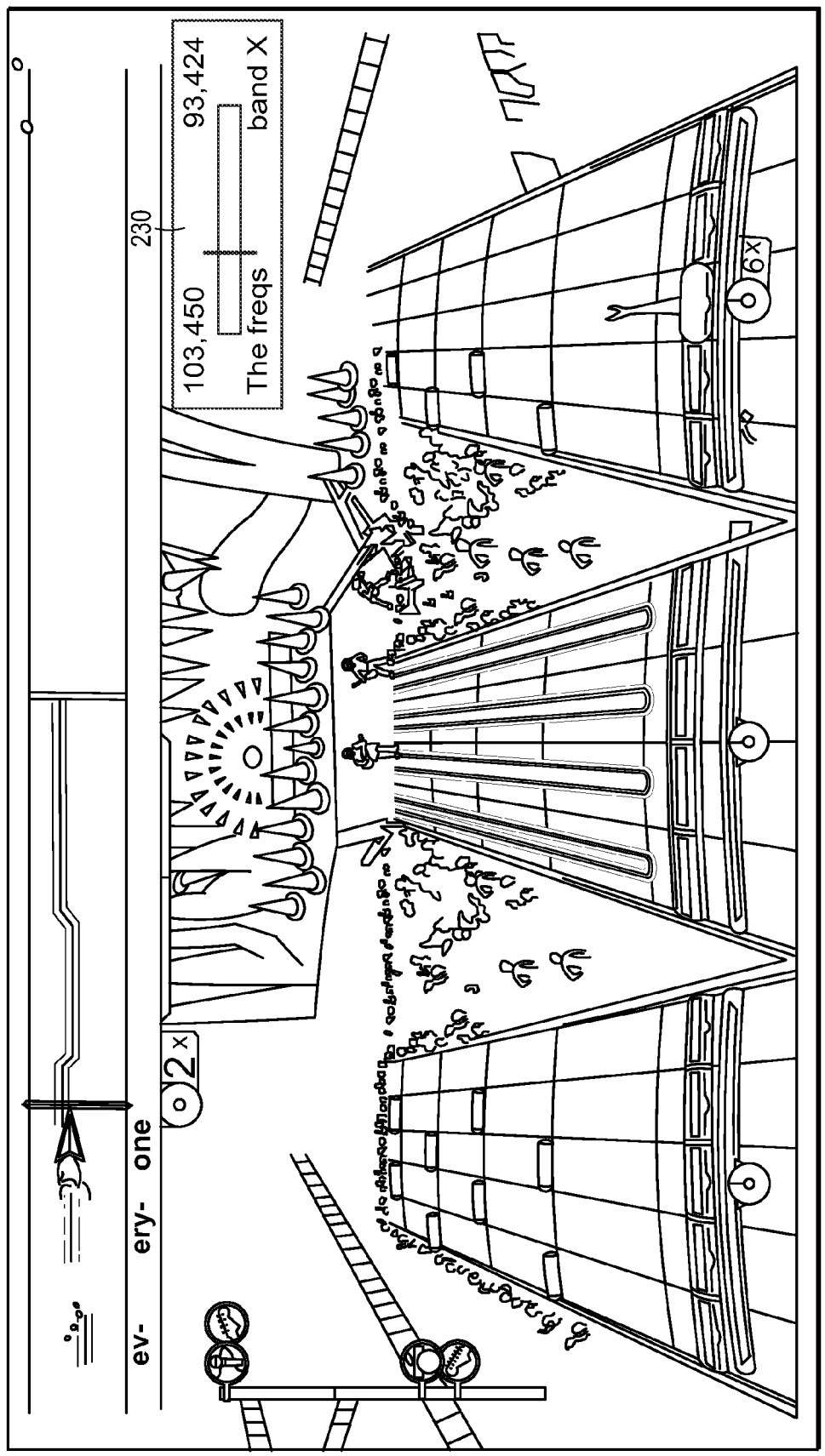
FIG. 2C is a second exemplary screenshot of a band competing on a challenge in a battle-of-the-bands mode.

Still referring to FIG. 2B, now in greater detail a running score 224 of another band may be displayed to provide a simulation of live competition, even in cases where the other band's performance occurred in the past. A running indication of a band's performance with respect to another band may be displayed in any manner. In some embodiments, a score comparison may be shown. In other embodiments, a "tug-of-war" style meter may be shown which illustrates a band's performance relative to the other band. Referring to FIG. 2C, one example of a tug-of-war meter 230 is shown. The meter shows a readout of the score of the band ("band X") currently playing, and a readout of the running score of the band they have been matched against ("The freqs"). The meter also contains a line that moves towards the band with the higher current score. The position of the line on the meter may be computed using any algorithm. In some embodiments, the meter may be weighted to reflect shifts in relative score momentum of the bands. In this way, the meter may enhance the illusion that the band is competing in real-time against another band.

In any embodiments, other indications may be used additionally or alternatively to indicate a band's performance relative to another band that has completed the challenge, including without limitation crowd noise, crowd animation, venue animation, venue lighting, a graphical depiction of the other band, changes in mood of player avatars, and/or status messages.

The running score for the other band may be computed and displayed in any manner. In some embodiments, the other band's running score may be computed by taking the total score achieved by the other band and determining the average score the other band achieved for a given unit of the challenge. The units may be cues, time periods, or any other divisions of songs. For example, if a band scored 100,000 points on a challenge that contained 2500 cues, the band averaged 40 points per cue. Thus, as each cue passes the band playing the challenge, the other bands running score may be increased by 40 points. In this manner, a band can be given the illusion that they are competing live against another band, without requiring that the bands complete a challenge at the same time, or without requiring anything other than the total score of the bands being saved on a central server. In other embodiments, more granular measures of the first band's performance may be saved to provide a more realistic running tally. For example, instead of only saving a total score, a score for each song in the challenge may be saved, and then a per-cue average score for each song may be used to update the running display.

In some embodiments, a band may be able to select the band they are matched against for battle-of-the-bands gameplay. For example, a band may select to be matched against a particular friend's band, so that they can see whether they can beat that band's score on the challenge. Or for example, a band may select to be matched against the band that has scored the highest on the challenge so far. Or for example, a band may select to be matched against the band that has scored the highest on the challenge so far at a particular difficulty setting. Or for example, a band may select to be matched against the band that has completed the challenge most recently.

In other embodiments, when a band elects to compete in a challenge in battle-of-the-bands mode, a band they will compete against is selected for them. For example, when a band enters battle-of-the-bands mode for a specific challenge, the band may be automatically matched up against another band of similar skill level that has completed the challenge. Or for example, the band may be automatically matched against a band comprising one or more members who are "friends" of one or more members of the band. A "friend" may be a second player a first player has previously played games with, chatted with online using console messaging services, or have been otherwise designated as a player known to the first player.

A detailed example of how a band may be automatically matched against another band for asynchronous battle-of-the-bands follows. For each challenge, the server maintains a ranked listing of all bands that have completed the challenge, and the scores of those bands. When a band elects to compete in the challenge, if the band has already competed at least once in the challenge, the following rules apply:
1) If the band is #1 overall, the band competes against its own previous top score
2) If the band is in the top 100 overall, the band competes against the score of the band ranked above that band.
3) If the band ranked #1 among all bands identified as "friends" of the band, the band competes against the score of the band ranked #100 overall
4) If a friend's band is ranked higher, the band competes against the friend's band that is ranked immediately above the band.
5) If the band has not yet completed the challenge, the band competes against the lowest-ranked friend, or, if no friend exists, the lowest-ranked band overall.

In other embodiments, any other combinations, modifications, and/or subsets of the above rules may be used. For example, the above rules may be applied, but where if a band has not yet completed the challenge, they are matched against a random band.

After a battle-of-the-bands session, information may be displayed to a player indicating their new rank on the challenge, both overall and/or among their friends. Along with the battle-of-the-bands feature, the server may provide interfaces for a console to access leaderboards and other information about each challenge. For example, a player may be able to browse a leaderboard of the top scores for a given challenge, and see the bands that have earned those scores. The player may also browse information about each challenge, such as the time the challenge will be available.

Figure 2D:
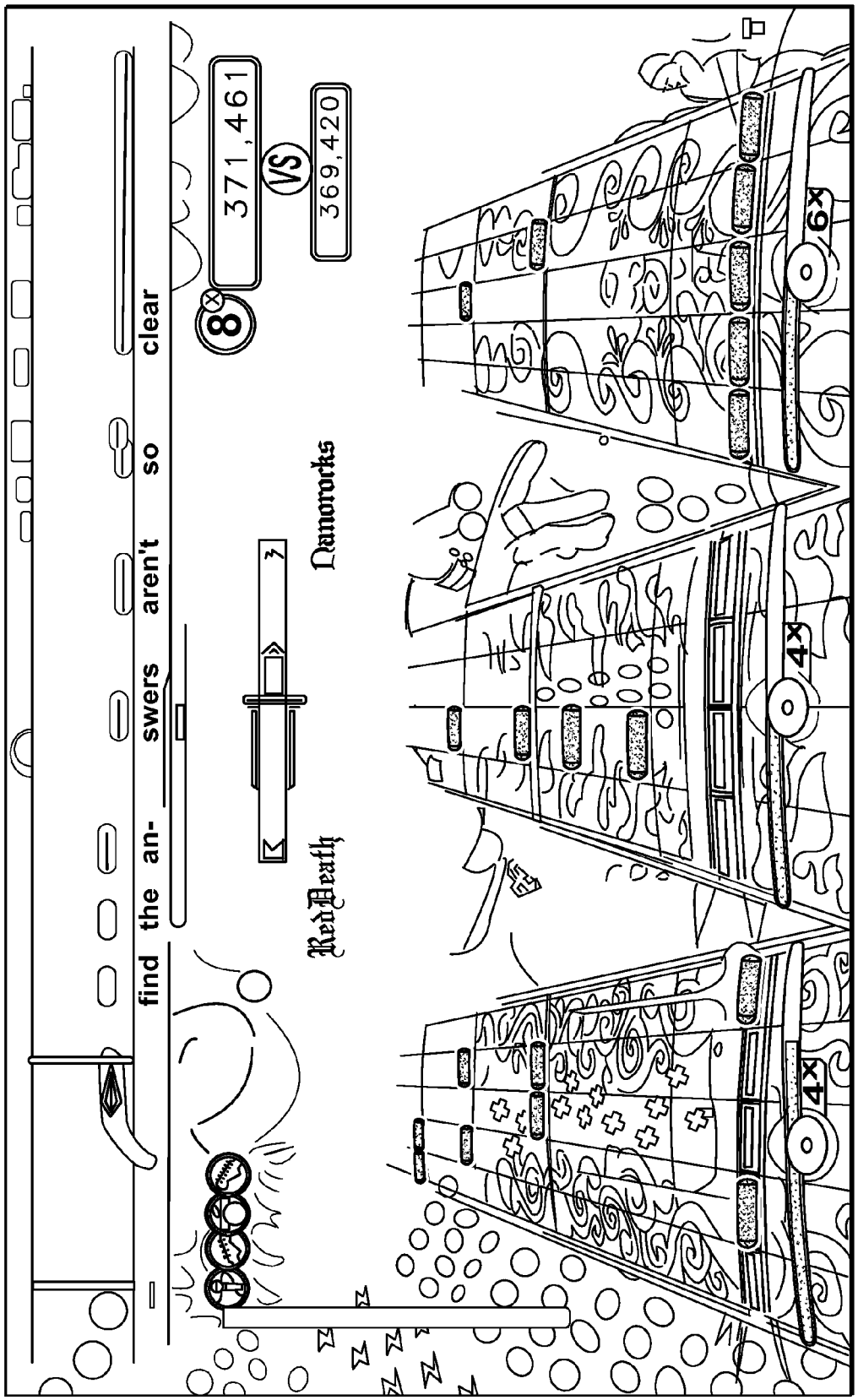
FIG. 2D is a third exemplary screenshot of a band competing on a challenge in a battle-of-the-bands mode.

Referring now to FIG. 2D, a third example screenshot of a band competing on a challenge in a battle-of-the-bands mode is shown. In the example shown a local band "Nanorocks" is competing against a score previously obtained by the band "RedDeath." The local band's score is shown above the "vs." indicator and the running score for the other band is shown below the "vs." A tug-of-war style meter is shown in the center that displays the relative performance of the bands. As the local band does better than the other band, the bar moves to the right. As the local band fall below the pace of the other band, the bar moves to the left. In some embodiments, the movement of the bar may be capped at a certain amount. In other embodiments, movement of the bar gives more weight to more recent performance.

Figure 3:
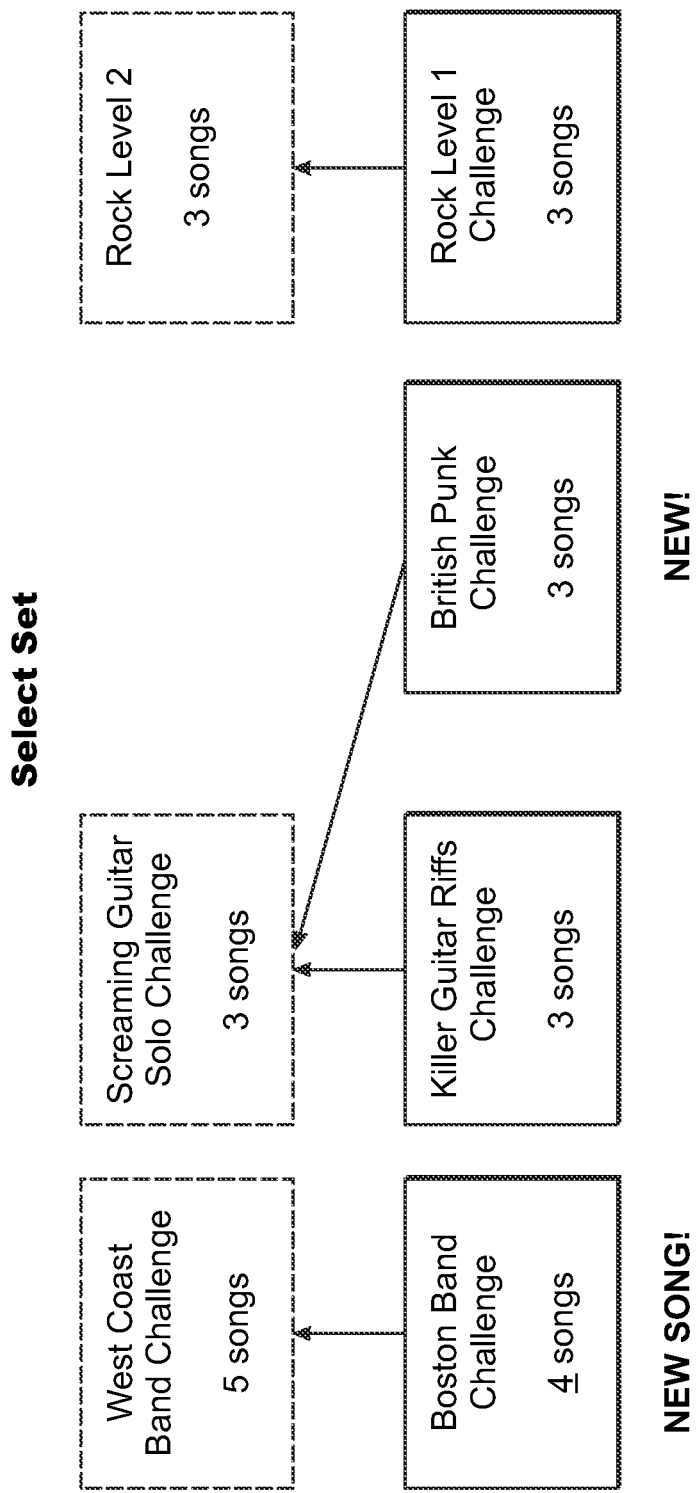
FIG. 3 is an exemplary screenshot of a game that modifies an existing game structure in response to downloaded content.

Referring now to FIG. 3, an example screenshot of a game that modifies an existing game structure in response to downloaded content is shown. In brief overview, a number of set lists, or challenges, are displayed to a player. The player has the option of selecting any of the currently available challenges to complete (in the figure, available challenges are shown with a solid border, while unavailable challenges are shown with a dashed border). Each challenge may unlock a number of other challenges upon successful completion. For example, completing the "Boston Band Challenge" unlocks the "West Coast Band Challenge." Alternatively, a challenge may be unlocked upon the band achieving a particular rank for an earlier challenge, e.g., being in the top 1000 highest scoring bands for that challenge.

Still referring to FIG. 3, a video game on a game console may be sold with a certain amount of content included on the game disc. For example, rhythm action game may and include a first number of songs on the game disc which may be played. An additional number of songs may be made available for free or paid download at the time of the game's release and/or at later times.

As additional songs are downloaded, existing challenges may be updated to include the downloaded songs. In some embodiments, downloaded songs may come with information specifying a genre, decade of release, or any other information which may enable the songs to be classified in groups along with the previously existing songs. Thus, a downloaded song may specify that it is a rock song from the 1970s, and be placed into any challenges involving the 1970s and/or rock. In other embodiments, downloaded songs may explicitly specify one or more challenges the songs should be added to. In some embodiments, the downloaded songs may also specify one or more conditions on their addition to a challenge, such as the existence of other content or songs on the game platform. In other embodiments, the challenges themselves may contain conditions on which downloaded songs are added. For example, it may be desirable that a "songs of 1985" challenge be limited to no more than 5 songs, even if a user downloads 7 songs from 1985.

Upon a newly downloaded song being added to a challenge, the challenge may subsequently be marked as incomplete or otherwise unfinished until a player completes the challenge including the new material. In some embodiments, a bonus or extra reward may be given to a player who successfully completes a challenge having additional content. Additionally, by downloading new songs, new challenges may be made available (e.g. downloading a song by a British artist may unlock the "British Punk challenge," and existing challenges may be modified (e.g. the extra song is added to the "Boston Band Challenge."

In some embodiments, bands and/or players may create their own challenges. For example, a player or band may select a set of songs and post a challenge to other bands to complete the same set of songs with a higher score. The band and/or players may then specify any number of constraints for the challenge. Challenges may also be created by the battle-of-the-bands server, and the administrator of the server may allow or disallow gameplay challenges submitted by players to the server.

In some embodiments, challenges may be sorted into two or more tiers according to their difficulty. A player may advance up to challenges in higher tiers by successfully completing challenges in lower tiers. In some embodiments, multiple paths may be provided to unlock a given tier and/or challenge in a tier. For example, in FIG. 3, a player may unlock the "Screaming Guitar Solo Challenge" by completing either the "Killer Guitar Riffs Challenge" or the "British Punk Challenge." Thus, by downloading new songs, a player can increase the number of paths available to unlock a given challenge and/or a specific tier of challenges.

In some embodiments, new challenges may be automatically created upon downloading of new content. For example, a new challenge may be created any time a user downloads an entire album of songs, with the challenge comprising playing all the songs on the album. Or for example, a new challenge may be created any time a player obtains 3 or more songs from a given artist, with the challenge comprising playing all the songs of that artist. Such a challenge may be automatically created even if the three songs in the challenge were not downloaded at the same time. Such a challenge may be created even in cases where the songs by the artist are a mix of downloaded songs and songs contained on a game disc. Challenges may also be automatically created if a user downloads a designated collection of songs, such as, for example, a "punk pack." The challenge may then comprise all the songs in the pack.

Automatically created challenges may be placed into a tiered challenge system in any way. In some embodiments, a tiered challenge structure may require that a player complete a certain number of challenges in a tier to advance to the next-highest tier. As a challenge is automatically created, it may be assigned to a tier based on the difficulty level of one or more songs in the challenge. For example, a challenge may be assigned to a tier based on the difficulty of the most difficult song in the challenge.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as a game platform such as a dedicated game console, e.g., PLAYSTATION® 2, PLAYSTATION® 3, or PSP® manufactured by Sony Corporation; WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, both general and special-purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM, DVD-ROM, or BLU-RAY™ disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

In some embodiments, implementation of the methods described herein limit the game server to a particular purpose, e.g., administering battle of the bands competition. In these scenarios, the game server combined with the software described herein, in effect, becomes a particular machine while the software is executing. In some embodiments, though other tasks may be performed while the software is running, execution of the software still limits the game server and may negatively impact performance of the other tasks. The game server also can receive inputs provided by one or more players to game platforms in communication with the server, perform operations and calculations on those inputs, and send the game platforms data such as results from the operations and calculations, thereby transforming the input received from the players into data used by the game platforms for visual representation of the input and/or the visual representation of an effect caused by the player such as those shown in the figures.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method executed on a game server in signal communication with a game platform, the method comprising:
providing, by the game server to the game platform, a gameplay challenge, wherein the gameplay challenge includes one or more songs to be completed by a first band comprising a first group of players;
receiving, by the game server, first musical game input data associated with the gameplay challenge, representing a musical performance of the first group of players at the game platform;
calculating, by the game server, a first composite score associated with the first musical game input data associated with the gameplay challenge;
comparing, by the game server, the first composite score to a stored second composite score associated with a second band comprising a second group of players, the stored second composite score associated with second musical input data representing a musical performance of the second group of players for the gameplay challenge;
causing the display of, on a display in signal communication with the game platform, the comparison using a graphical indicator; and
wherein the graphical indicator appears as a tug of war between the first group and the second group.

2. The method of claim 1, further comprising determining, by the game server, a performance ranking associated with the gameplay challenge for the first group upon completion of the challenge, the ranking based on the first composite score.

3. The method of claim 1, further comprising producing, by a speaker in signal communication with the game platform, the comparison using an audible indicator.

4. The method of claim 3, wherein the audible indicator is at least one of crowd noise, a distortion effect, and a volume increase.

5. The method of claim 1 wherein the graphical indicator further includes at least one of a score comparison, a performance meter, crowd animation, venue animation, venue lighting, a graphical depiction of the second group of players, changes in mood of player avatars, and status messages.

6. The method of claim 1, wherein the graphical indicator indicates a score momentum for the first group and second groups.

7. The method of claim 1, wherein the comparison is updated in real time based on a change to the first composite score.

8. The method of claim 1, further comprising storing, by the game server, gameplay aspects of the performance represented by the first musical game input data.

9. The method of claim 1, further comprising storing, by the game server, the composite score for the first group of players in a storage device.

10. The method of claim 1, further comprising matching, by the game server, the first group of players and the second group of players for the comparison.

11. The method of claim 10, the matching comprising selecting the second group of players based on a performance ranking associated with the gameplay challenge for the second group.

12. The method of claim 10, the matching comprising selecting the second group of players based on an association between at least one player in the first group of players and at least one player in the second group of players.

13. The method of claim 10, the matching comprising selecting the second group of players based on input from the first group of players.

14. The method of claim 10, the matching comprising randomly selecting the second group of players.

15. The method of claim 10, the matching comprising selecting the second group of players as the group of players to most recently complete the challenge.

16. The method of claim 10, the matching comprising selecting the second group of players based on a performance ranking associated with performance unrelated to the gameplay challenge.

17. The method of claim 1 wherein the gameplay challenge comprises one or more songs corresponding to a theme.

18. The method of claim 1, wherein the gameplay challenge includes one or more constraints which affect performance of the gameplay challenge.

19. The method of claim 18, wherein the constraints include at least one of difficulty level, completion during a particular time period, number of players, maximum number of attempts, type of instrument or instruments to be used, minimum qualifying score, completion of other gameplay, and completion of another gameplay challenge.

20. The method of claim 1, wherein the gameplay challenge includes one or more objectives associated with completion of the gameplay challenge.

21. The method of claim 20, wherein the objectives include at least one of achieving a particular score, achieving a highest score, achieving a lowest score, a particular number of consecutive notes played, a number of bonuses received, and a high level of audience enthusiasm.

22. The method of claim 1, wherein all of the first group of players provide musical game input data to the same game platform.

23. The method of claim 1, wherein at least one player from the first group of players provides musical game input data to a game platform different than the game platform of the other players of the first group.

24. The method of claim 1, wherein the second group of players provides musical game input data to the same game platform as the first group.

25. The method of claim 1, wherein the second group of players provides input data to a game platform different than the game platform of the first group.

26. The method of claim 1, wherein the first composite score and the second composite score are based in part on a performance level of each player in the respective groups of players.

27. The method of claim 1, further comprising determining a winner of the gameplay challenge based on the comparison.

28. The method of claim 1, further comprising providing, by the game server, an interface for the game platform to access information associated with the gameplay challenge.

29. The method of claim 1, wherein the second group of players is the same as the first group of players.

30. The method of claim 1, further comprising determining that the game platform has downloaded content.

31. The method of claim 30, wherein determining the game platform has downloaded content is performed by the game platform.

32. The method of claim 30, wherein determining the game platform has downloaded content is performed by the game server.

33. The method of claim 30, further comprising, in response to determining the game platform has downloaded content, making an additional gameplay challenge available to the first group of players.

34. The method of claim 33, wherein the downloaded content comprises one or more songs of an album and the additional gameplay challenge comprises playing one or more songs of the album.

35. The method of claim 33, wherein the downloaded content comprises one or more songs from an artist and the additional gameplay challenge comprises playing one or more songs of the artist.

36. The method of claim 33, wherein the downloaded content comprises one or more songs of a designated collection and the additional gameplay challenge comprises playing one or more songs of the designated collection.

37. The method of claim 33, wherein the additional gameplay challenge comprises one or more songs of the downloaded content and one or more songs provided by the game platform.

38. The method of claim 30, further comprising, in response to determining the game platform has downloaded content, modifying the gameplay challenge to include the downloaded content.

39. The method of claim 38, wherein the gameplay challenge is modified to include the downloaded content based on information contained within the downloaded content.

40. The method of claim 1, further comprising, in response to the musical game input data provided by the first group of players, making an additional gameplay challenge available to the first group of players.

41. The method of claim 40, further comprising sorting the gameplay challenge and the additional gameplay challenge into tiers.

42. The method of claim 41, further comprising assigning a challenge to a tier based on the difficulty of one or more songs in the gameplay challenge.

43. The method of claim 1, wherein the gameplay challenge is created by either the first or second group of players or an administrator of a battle-of-the-bands server.

44. The method of claim 1, wherein a gameplay mechanic is altered for a session during the gameplay challenge.

45. The method of claim 44 wherein altering the game mechanic comprises making a bonus or reward available during the gameplay challenge that is not available during nonchallenge gameplay, removing a bonus or reward during the gameplay challenge that is available during non-challenge gameplay, and penalizing the first or second group of players for failing.

46. A method executed on a game server in signal communication with a game platform, the method comprising:
    providing, by the game server to the game platform, a gameplay challenge, wherein the gameplay challenge includes one or more songs to be completed by a first band comprising a first group of players;
    receiving, by the game server, first musical game input data associated with the gameplay challenge, representing a musical performance of the first group of players at the game platform;
    calculating, by the game server, a first composite score associated with the first musical game input data associated with the gameplay challenge;
    comparing, by the game server, the first composite score to a stored second composite score associated with a second band comprising a second group of players, the stored second composite score associated with second musical input data representing a musical performance of the second group of players for the gameplay challenge; and
    matching, by the game server, the first group of players and the second group of players for the comparison, the matching comprising selecting the second group of players as the group of players to most recently complete the challenge.

47. A method executed on a game server in signal communication with a game platform, the method comprising:
    receiving, by the game server, first musical game input data representing a musical performance of a first group of players;
    calculating, by the game server, a first composite score associated with the first musical game input data, and based on a gameplay challenge;
    comparing, by the game server, the first composite score to a stored second composite score associated with a second group of players, the stored second composite score associated with second musical input data representing a musical performance of the second group and based on the gameplay challenge;
    causing the display of, on a display in signal communication with the game platform, the comparison using a graphical indicator; and
    wherein the graphical indicator appears as a tug of war between the first group and the second group.

48. A method executed on a game server in signal communication with a game platform, the method comprising:
    receiving, by the game server, first musical game input data representing a musical performance of a first group of players;
    calculating, by the game server, a first composite score associated with the first musical game input data, and based on a gameplay challenge;
    comparing, by the game server, the first composite score to a stored second composite score associated with a second group of players, the stored second composite score associated with second musical input data representing a musical performance of the second group and based on the gameplay challenge; and
    matching, by the game server, the first group of players and the second group of players for the comparison, the matching comprises selecting the second group of players as the group of players to most recently complete the challenge.

* * * * *